(12) United States Patent
Hendry

(10) Patent No.: US 12,418,673 B2
(45) Date of Patent: Sep. 16, 2025

(54) METHOD FOR PROCESSING MEDIA FILE AND DEVICE THEREFOR

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 18/245,657

(22) PCT Filed: Sep. 16, 2021

(86) PCT No.: PCT/KR2021/012660
§ 371 (c)(1),
(2) Date: Mar. 16, 2023

(87) PCT Pub. No.: WO2022/060113
PCT Pub. Date: Mar. 24, 2022

(65) Prior Publication Data
US 2023/0336761 A1    Oct. 19, 2023

Related U.S. Application Data

(60) Provisional application No. 63/079,440, filed on Sep. 16, 2020.

(51) Int. Cl.
*H04N 19/463* (2014.01)
*H04N 19/132* (2014.01)
(Continued)

(52) U.S. Cl.
CPC ......... *H04N 19/463* (2014.11); *H04N 19/132* (2014.11); *H04N 19/136* (2014.11);
(Continued)

(58) Field of Classification Search
None
See application file for complete search history.

(56) References Cited

U.S. PATENT DOCUMENTS

2015/0103927 A1* 4/2015 Hannuksela ......... H04N 19/159
   375/240.26
2016/0234516 A1* 8/2016 Hendry .................. H04N 19/70
(Continued)

FOREIGN PATENT DOCUMENTS

KR   10-2017-0021908    2/2017
KR   10-2017-0101983    9/2017
(Continued)

*Primary Examiner* — Stefan Gadomski
(74) *Attorney, Agent, or Firm* — Fish & Richardson P.C.

(57) ABSTRACT

A method for generating a media file according to the present document is characterized by comprising the steps of: configuring flag information about whether profile tier level (PTL) information exists; configuring information about operating points on the basis of the flag information; and generating a media file including a decoder configuration record, wherein the decoder configuration record includes the flag information, the information about the operating points is configured in the decoder configuration record on the basis of the flag information equal to 1, and the information about the operating points includes information about an average frame rate, information about a constant frame rate, and information about the number of temporal sub-layers.

16 Claims, 6 Drawing Sheets

(51) Int. Cl.
*H04N 19/136* (2014.01)
*H04N 19/172* (2014.01)
*H04N 19/31* (2014.01)
*H04N 19/44* (2014.01)
*H04N 19/70* (2014.01)

(52) U.S. Cl.
CPC ........... *H04N 19/172* (2014.11); *H04N 19/31* (2014.11); *H04N 19/44* (2014.11); *H04N 19/70* (2014.11)

(56) References Cited

U.S. PATENT DOCUMENTS

| | | | |
|---|---|---|---|
| 2017/0019673 A1* | 1/2017 | Tsukuba | H04N 19/30 |
| 2019/0014351 A1 | 1/2019 | Tsukuba et al. | |
| 2021/0274204 A1* | 9/2021 | He | H04N 19/187 |
| 2021/0306671 A1* | 9/2021 | Chen | H04N 19/132 |

FOREIGN PATENT DOCUMENTS

| KR | 10-2018-0039626 | 4/2018 |
|---|---|---|
| KR | 10-2040383 | 11/2019 |

* cited by examiner

METHOD FOR PROCESSING MEDIA FILE AND DEVICE THEREFOR

CROSS-REFERENCE TO RELATED APPLICATIONS

This application is a National Stage application under 35 U.S.C. § 371 of International Application No. PCT/KR2021/012660, filed on Sep. 16, 2021, which claims the benefit of U.S. Provisional Application No. 63/079,440, filed on Sep. 16, 2020. The disclosures of the prior applications are incorporated by reference in their entirety.

TECHNICAL FIELD

The present disclosure relates to image coding technology, and more particularly, to a method and apparatus for processing a media file for coded image information in an image coding system.

BACKGROUND

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The technical problem of the present disclosure is to provide a method and apparatus for increasing image coding efficiency.

Another technical problem of the present disclosure is to provide a method and apparatus for generating a media file for coded image information.

According to an embodiment of the present disclosure, a media file generating method performed by a media file generating apparatus is provided. The method comprises configuring flag information on whether Profile Tier Level (PTL) information is present, configuring information on operating points based the flag information, and generating a media file including a decoder configuration record, wherein the decoder configuration record includes the flag information, wherein the information on the operating points is configured in the decoder configuration record based on the flag information being equal to 1, and wherein the information on the operating points includes information on average frame rate, information on constant frame rate and information on a number of temporal sublayers.

According to another embodiment of the present disclosure, a media file generating apparatus is provided. The media file generating apparatus comprises a image processing unit which is configuring flag information on whether Profile Tier Level (PTL) information is present and configuring information on operating points based the flag information, and a media file generating unit which is generating a media file including a decoder configuration record, wherein the decoder configuration record includes the flag information, wherein the information on the operating points is configured in the decoder configuration record based on the flag information being equal to 1, and wherein the information on the operating points includes information on average frame rate, information on constant frame rate and information on a number of temporal sublayers.

According to another embodiment of the present disclosure, a media file processing method performed by a media file processing apparatus is provided. The method comprises obtaining a media file including a decoder configuration record, and parsing the decoder configuration record, wherein the decoder configuration record includes flag information on whether Profile Tier Level (PTL) information is present, wherein parsing the decoder configuration record comprises, parsing information on operating points based the flag information, wherein the information on the operating points is configured in the decoder configuration record based on the flag information being equal to 1, and wherein the information on the operating points includes information on average frame rate, information on constant frame rate and information on a number of temporal sublayers.

According to another embodiment of the present disclosure, a media file processing apparatus is provided. The media file processing apparatus a receiving unit which is obtaining a media file including a decoder configuration record and a media file processing unit which is parsing the decoder configuration record, wherein the decoder configuration record includes flag information on whether Profile Tier Level (PTL) information is present, wherein parsing the decoder configuration record comprises, parsing information on operating points based the flag information, wherein the information on the operating points is configured in the decoder configuration record based on the flag information being equal to 1, and wherein the information on the operating points includes information on average frame rate, information on constant frame rate and information on a number of temporal sublayers.

According to another embodiment of the present disclosure, a computer-readable digital storage medium in which a media file generated by a media file generating method is stored is provided. In the computer-readable digital storage medium, the method comprises configuring flag information on whether Profile Tier Level (PTL) information is present, configuring information on operating points based the flag information, and generating a media file including a decoder configuration record, wherein the decoder configuration record includes the flag information, wherein the information on the operating points is configured in the decoder configuration record based on the flag information being equal to 1, and wherein the information on the operating points includes information on average frame rate, information on constant frame rate and information on a number of temporal sublayers.

According to the present disclosure, when PTL information does not present in a VVC decoder configuration record, information on an average frame-rate, information on a constant frame rate, information on a number of temporal sublayers that do not need to be present in the VVC decoder configuration record may not be signaled, and through this, signaling redundancy for media file delivery can be reduced and overall coding efficiency can be improved.

According to the present disclosure, flag information indicating whether information on an operation point including all NAL units in a track, not just an operation point corresponding to a specific OLS, is present or not may be configured, and through this, signaling redundancy for media file delivery can be reduced and overall coding efficiency can be improved.

DETAILED DESCRIPTION

Figure 1:
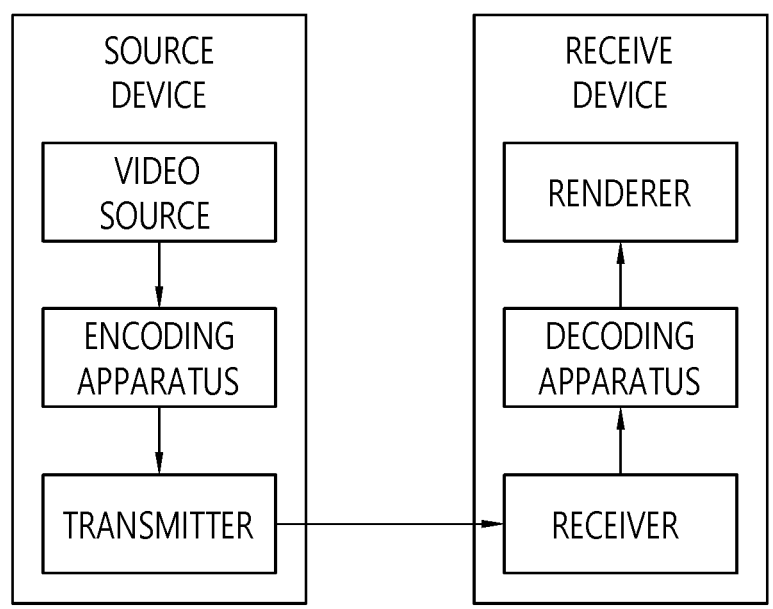
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bit stream.

The transmitter may transmit the encoded image/image information or data output in the form of a bit stream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bit stream and transmit the received bit stream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
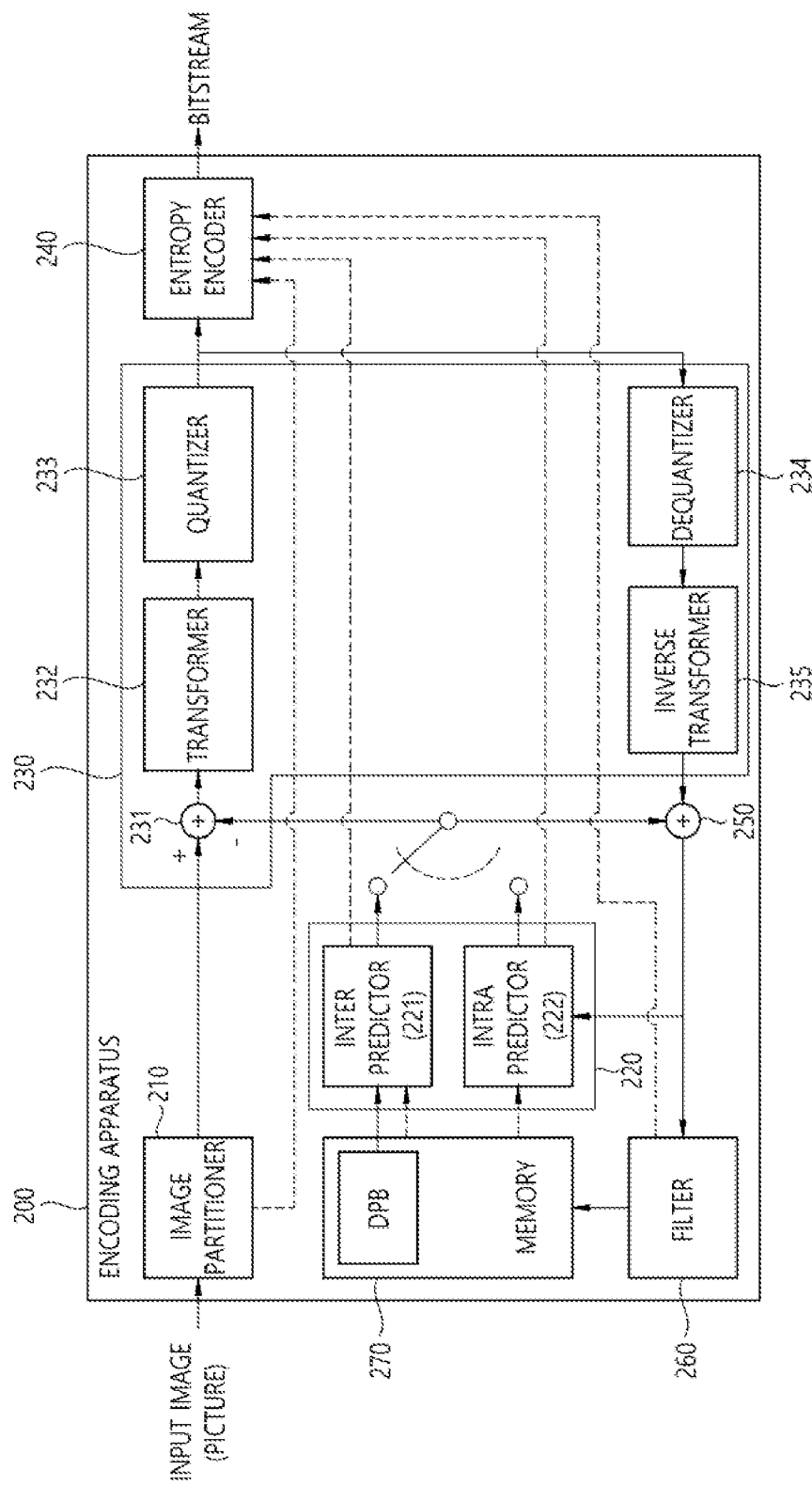
FIG. 2 is a schematic diagram illustrating a configuration of a video/image encoding apparatus to which the embodiments of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bit stream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bit stream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bit stream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bit stream. The bit stream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bit stream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
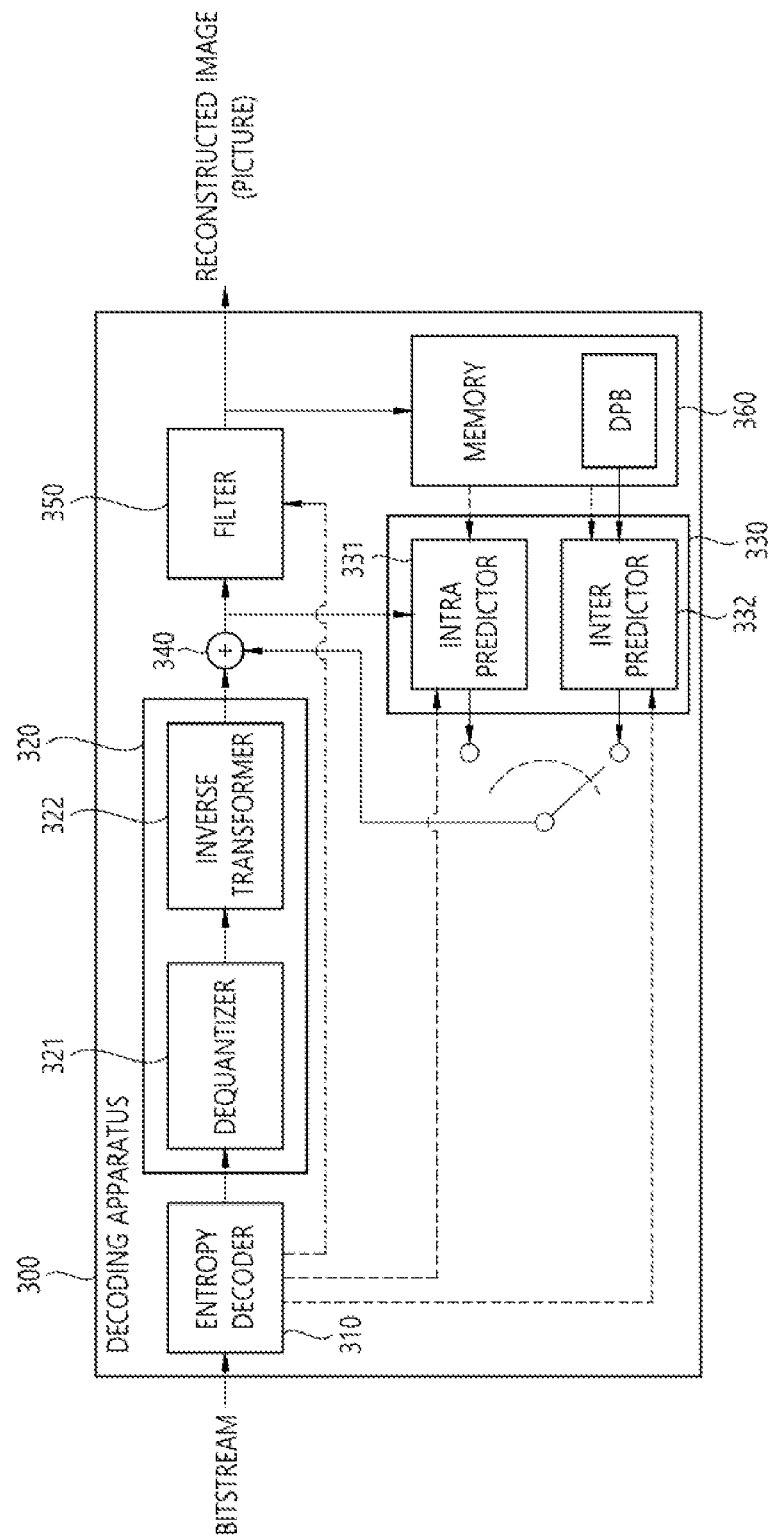
FIG. 3 is a schematic diagram illustrating a configuration of a video/image decoding apparatus to which the embodiments of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bit stream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bit stream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bit stream, and the received signal may be decoded through the entropy decoder 310. For example, the entropy decoder 310 may parse the bit stream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bit stream. For example, the entropy decoder 310 decodes the information in the bit stream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bit stream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be equally applied or applied correspondingly to the filter 350, the inter predictor 332, and the intra predictor 331 of the decoding apparatus 300.

Meanwhile, the above-described encoded image/video information may be configured based on a media file format to generate a media file. For example, encoded image/video information may form a media file (segment) based on one or more NAL unit/sample entries for the encoded image/video information. The media file may include a sample entry and a track. For example, a media file (segment) may include various records, and each record may include image/video related information or media file format related information. Also, for example, one or more NAL units may be stored in a configuration record (or decoder configuration record, or VVC decoder configuration record) field of a media file. Here, the field may also be called a syntax element.

For example, ISO Base Media File Format (ISOBMFF) may be used as a media file format to which the method/embodiment disclosed in the present disclosure may be applied. ISOBMFF may be used as the basis for many codec encapsulation formats such as AVC file format, HEVC file format and/or VVC file format and many multimedia container formats such as MPEG-4 file format, 3GPP file format (3GP) and/or DVB file format. Also, in addition to continuous media such as audio and video, static media such as images and metadata may be stored in a file according to ISOBMFF. A file structured according to ISOBMFF may be used for various purposes such as local media file playback, progressive downloading of a remote file, segments for Dynamic Adaptive Streaming over HTTP (DASH), containers and packetization instructions of content to be streamed, and recording of received real-time media streams.

A 'box' described later may be an elementary syntax element of ISOBMFF. An ISOBMFF file may consist of a sequence of boxes, and each box may contain other boxes. For example, a movie box (a box whose grouping type is 'moov') may include metadata for continuous media streams in a media file, and each stream may be represent as a track in a file. Metadata for a track may be included in a track box (a box whose grouping type is 'trak'), and media content of a track may be included in a media data box (a box whose grouping type is 'mdat') or directly in a separate file. The media content of a track may consist of a sequence of samples, such as audio or video access units. For example, ISOBMFF may include a media track including an elementary media stream, media transmission instructions. ISOBMFF may specify types of tracks such as a hint track representing the received packet stream and a timed metadata track including time synchronized metadata.

Also, ISOBMFF is designed for storage, but is also very useful for streaming such as progressive download or DASH. For streaming purposes, movie fragments defined in ISOBMFF may be used. A fragmented ISOBMFF file may represent, for example, two tracks related to video and audio. For example, if random access is included after receiving a 'moov' box, all movie fragments 'moof' may be decoded along with related media data.

In addition, the metadata of each track may include a list of sample description entries providing a coding or encapsulation format used in the track and initialization data necessary to process the format. Also, each sample may be associated with one of the sample description entries of the track.

Using ISOBMFF, sample-specific metadata may be specified by various mechanisms. Specific boxes within a sample table box (a box whose grouping type is 'stbl') may be standardized to correspond to general requirements. For example, a sync sample box (a box whose grouping type is 'stss') may be used to list random access samples of a track. The sample grouping mechanism allows to map samples according to a four-character grouping type into groups of samples that share the same property specified by a sample group description entry in the file. Several grouping types may be specified in ISOBMFF.

On the other hand, a 'sample' described later may be all data related to a single time or single element in one of three sample arrays (Y, Cb, Cr) representing a picture. For example, when the term 'sample' is used in the context of a track (of a media file format), it may refer to all data related to a single time of the track. Here, the time may be a decoding time or a composition time. In addition, for example, when the term 'sample' is used in the context of a picture, that is, when it is used with the phrase "luma sample", it may refer to a single element in one of the three sample arrays representing the picture.

Meanwhile, in order to store VVC content, the following three types of elementary streams may be defined.

a video elementary stream that does not include any parameter sets. Here, all parameter sets may be stored in a sample entry or sample entries.

a video and parameter set elementary stream that may include parameter sets, and may also have the parameter sets stored in their sample entry or sample entries.

a non-VCL elementary stream that includes non-VCL NAL units synchronized with the elementary stream included in a video track. Here, the VVC non-VCL track does not include a parameter set in sample entries.

Meanwhile, the operating points information of the ISO based media file format (ISOBMF) for VVC may be signaled as a sample in a group box whose grouping type is 'vopi' or an entity group whose grouping type is 'opeg'. Here, the operating point may be a temporal subset of the OLS identified by an Output Layer Set (OLS) index and a highest value of TemporalId. Each operating point may be associated with a profile, tier, and level (i.e., PTL) that defines the conformance point of the operating point. The operating points information may be needed to identify a sample and a sample entry for each operating point.

Information on the constitution of the operating points may be provided to applications using various operating points and an operating point information sample group ('vopi') provided in a given VVC bitstream. Each operating point is associated with OLS, the maximum TemporalId value, profile, level and tier signaling. All of the above information may be captured by the 'vopi' sample group. Apart from the above information, the sample group may also provide dependency information between layers.

Meanwhile, when one or more VVC tracks exist for a VVC bitstream and an operating point entity group does not exist for the VVC bitstream, all of the following items may be applied.

Among the VVC tracks for the VVC bitstream, there shall be only one track that carries a 'vopi' sample group.

All the other VVC tracks of the VVC bitstream shall have a track reference of type 'oref' for the track that carries the 'vopi' sample group.

In addition, for any specific sample in a given track, a temporally collocated sample in another track may be defined as a sample having the same decoding time as the specific sample. For each sample SN of a track TN that has an 'oref' track reference for a track Tk that carries a 'vopi' sample group, the following may apply.

If there is a temporally collocated sample Sk in the track Tk, the sample SN may be associated with the same 'vopi' sample group entity as the sample Sk.

Otherwise, sample SN may be associated with the same vopi' sample group entity as the last of samples in the track Tk that precedes sample SN in decoding time.

When several VPSs are referenced in the VVC bitstream, several entities may need to be included in a sample group description box with grouping_type 'vopi'. In the more common case where a single VPS is present, it may be recommended to use the default sample group mechanism defined in ISO/IEC 14496-12 and include the operating point information sample group in the sample table box, rather than including it in each track fragment.

Also, grouping_type_parameter may not be defined for SampleToGroupBox whose grouping type is 'vopi'.

The 'vopi' sample group including the above-described operating point information, that is, the syntax of the operating point information sample group may be as shown in the table below.

TABLE 1

```
class VvcOperatingPointsRecord {
   unsigned int(8) num_profile_tier level minus1;
   for (i=0; i<=num_profile_tier_level_minus1; i++) {
      unsigned int(8) ptl_max_temporal_id[i];
      VvcPTLRecord(ptl_max_temporal_id[i]+1) ptl[i];
   }
   unsigned int(1) all_independent_layers_flag;
   bit(7) reserved = 0;
   if (all_independent_layers_flag) {
      unsigned int(1) each_layer_is_an_ols_flag;
      bit(7) reserved = 0;
   } else
      unsigned int(8) ols_mode_idc;
   unsigned int(16) num_operating_points;
   for (i=0; i<num_operating_points) {
      unsigned int(16) output_layer_set_idx;
      unsigned int(8) ptl_idx;
      unsigned int(8) max_temporal_id;
      unsigned int(8) layer_count;
      for (j=0; j<layer_count; j++) {
         unsigned int(6) layer_id;
         unsigned int(1) is_outputlayer;
         bit(1) reserved = 0;
      }
      bit(6) reserved = 0;
      unsigned int(1) frame_rate_info_flag
      unsigned int(1) bit_rate_info_flag
      if (frame_rate_info_flag) {
         unsigned int(16) avgFrameRate;
         bit(6) reserved = 0;
         unsigned int(2) constantFrameRate;
      }
      if (bit_rate_info_flag) {
         unsigned int(32) maxBitRate;
         unsigned int(32) avgBitRate;
      }
   }
   unsigned int(8) max_layer_count;
   for (i=0; i<max_layer_count; i++) {
      unsigned int(8) layerID;
      unsigned int(8) num_direct_ref_layers;
      for (j=0; j<num_direct_ref_layers; j++)
         unsigned int(8) direct_ref_layerID;
      unsigned int(8) max_tid_il_ref_pics_plus1;
   }
}
class VvcOperatingPointsInformation extends VisualSampleGroupEntry ('vopi') {
   VvcOperatingPointsRecord oinf;
}
```

In addition, semantics of the syntax of the operating point information sample group may be as shown in the following table.

TABLE 2 num_profile_tier_level_minus1 plus 1 gives the number of following profiles, tier, and level combinations as well as the associated fields.
ptl_max_temporal_id[i]: Gives the maximum TemporalID of NAL units of the associated bitstream for the specified i-th profile, tier, and level structure.
    NOTE: The semantics of ptl_max_temporal_id[i] and max_temporal_id of an operating point, given below, are different even though they may carry the same numerical value.
ptl[i] specifies the i-th profile, tier, and level structure.
all_independent_layers_flag, each_layer_is_an_ols_flag, TABLE 2-continued ols_mode_idc and max_tid_il_ref_pics_plus1 are defined in
  ISO/IEC 23090-3.
num_operating_points: Gives the number of operating points for which the
  information follows.
output_layer_set_idx is the index of the output layer set that defines the
  operating point. The mapping between output_layer_set_idx and the
  layer_id values shall be the same as specified by the VPS for an output layer
  set with index output_layer_set_idx.
ptl_idx: Signals the zero-based index of the listed profile, level, and tier
  structure for the output layer set with index output_layer_set_idx.
max_temporal_id: Gives the maximum TemporalId of NAL units of this
  operating point.
  NOTE: The maximum TemporalId value indicated in the layer information sample
  group has different semantics from the maximum TemporalId indicated here. However,
  they may carry the same literal numerical values.
layer_count: This field indicates the number of necessary layers, as defined
  ISO/IEC 23090-3, of this operating point.
layer_id: provides the nuh_layer_id values for the layers of the operating point.
is_outputlayer: A flag that indicates if the layer is an output layer or not. A one
  indicates an output layer.
frame_rate_info_flag equal to 0 indicates that no frame rate information is
  present for the operating point. The value 1 indicates that frame rate
  information is present for the operating point.
bit_rate_info_flag equal to 0 indicates that no bitrate information is
  present for the operating point. The value 1 indicates that bitrate information is
  present for the operating point.
avgFrameRate gives the average frame rate in units of frames/(256 seconds) for
  the operating point. Value 0 indicates an unspecified average frame rate.
constantFrameRate equal to 1 indicates that the stream of the operating point
  is of constant frame rate. Value 2 indicates that the representation of each
  temporal layer in the stream of the operating point is of constant frame rate.
  Value 0 indicates that the stream of the operating point may or may not be of
  constant frame rate.
maxBitRate gives the maximum bit rate in bits/second of the stream of the
  operating point, over any window of one second.
avgBitRate gives the average bit rate in bits/second of the stream of the
  operating point.
max_layer_count: The count of all unique layers in all of the operating points
  that relate to this associated base track.
layerID: nuh_layer_id of a layer for which the all the direct reference layers are
  given in the following loop of direct_ref_layerID.
num_direct_ref_layers: The number of direct reference layers for the layer
  with nuh_layer_id equal to layerID.
direct_ref_layerID: nuh_layer_id of the direct reference layer.

Also, for example, an operating point entity group may be defined to provide profile level information of the operating point and track mapping for the operating point.

In the case of aggregating samples of the track mapped to the operating point described in the operating point entity group, the implicit reconstruction process does not require removing any further NAL units to result in a conforming VVC bitstream. A track belonging to the operating point entity group shall have a track reference of type 'oref' for group_id indicated in the operating point entity group.

In addition, all entity_id values included in the operating point entity group shall belong to the same VVC bitstream. When present, OperatingPointGroupBox is included in GroupsListBox in the movie-level MetaBox and not included in the file-level or track-level MetaBox. Here, OperatingPointGroupBox may represent the operating point entity group.

The above-described syntax of the operating point entity group may be as shown in the table below.

TABLE 3

```
aligned(8) class OperatingPointGroupBox extends
EntityToGroupBox('opeg', 0, 0)
{
    unsigned int(8) num_profile_tier_level_minus1;
    for (i=0; i<=num_profile_tier_level_minus1; i++)
        VvcPTLRecord(0) opeg_ptl[i];
```

TABLE 3-continued

```
    unsigned int(16) num_operating_points;
    for (i=0; i<num_operating_points) {
        unsigned int(16) output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        bit(6) reserved = 0;
        unsigned int(1) frame_rate_info_flag
        unsigned int(1) bit_rate_info_flag
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
        unsigned int(8) entity_count;
        for (j=0; j<entity_count; j++) {
            unsigned int(8) entity_idx;
        }
    }
}
```

In addition, semantics of the syntax of the operating point entity group may be as shown in the following table.

TABLE 4 num_profile_tier_level_minus1 plus 1 gives the number of following
    profiles, tier, and level combinations as well as the associated fields.
opeg_ptl[i] specifies the i-th profile, tier, and level structure.
num_operating_points: Gives the number of operating points for which the
    information follows.
output_layer_set_idx is the index of the output layer set that defines the
    operating point. The mapping between output_layer_set_idx and the
    layer_id values shall be the same as specified by the VPS for an output layer set
    with index output_layer_set_idx.
ptl_idx: Signals the zero-based index of the listed profile, level, and tier structure for
    the output layer set with index output_layer_set_idx.
max_temporal_id: Gives the maximum TemporalId of NAL units of this operating
    point.
    NOTE: The maximum TemporalId value indicated in the layer information sample group
    has different semantics from the maximum TemporalId indicated here. However, they may
    carry the same literal numerical values.
layer_count: This field indicates the number of necessary layers, as defined
    ISO/IEC 23090-3, of this operating point.
layer_id: provides the nuh_layer_id values for the layers of the operating point.
is_outputlayer: A flag that indicates if the layer is an output layer or not. A one
    indicates an output layer.
frame_rate_info_flag equal to 0 indicates that no frame rate information is
    present for the operating point. The value 1 indicates that frame rate information is
    present for the operating point.
bit_rate_info_flag equal to 0 indicates that no bitrate information is present
    for the operating point. The value 1 indicates that bitrate information is present for
    the operating point.
avgFrameRate gives the average frame rate in units of frames/(256 seconds) for the
    operating point. Value 0 indicates an unspecified average frame rate.
constantFrameRate equal to 1 indicates that the stream of the operating point is of
    constant frame rate. Value 2 indicates that the representation of each temporal layer
    in the stream of the operating point is of constant frame rate. Value 0 indicates that
    the stream of the operating point may or may not be of constant frame rate.
maxBitRate gives the maximum bit rate in bits/second of the stream of the operating
    point, over any window of one second.
avgBitRate gives the average bit rate in bits/second of the stream of the operating
    point.
entity_count specifies the number of tracks that are present in an operating point.
entity_idx specifies the index to the entity_id list in the entity group that
    belongs to an operating point.

Also, for example, a media file may include decoder configuration information for image/video content. That is, the media file may include a VVC decoder configuration record including decoder configuration information.

When the VVC decoder configuration record is stored in a sample entry, the VVC decoder configuration record may include the size of a length field used for each sample to indicate the length of a NAL unit included in the VVC decoder configuration record as well as parameter sets. The VVC decoder configuration record may be framed externally (the size of the VVC decoder configuration record is supplied by the structure including the VVC decoder configuration record).

In addition, the VVC decoder configuration record may include a version field. For example, a version of the present disclosure may define version 1 of the VVC decoder configuration record. Incompatible changes to the VVC decoder configuration record may be indicated by a change of version number. If the version number is not recognized, readers shall not attempt to decode the VVC decoder configuration record or the stream to which the record applies.

Compatible extensions to the VVC decoder configuration record may not change the configuration version code. A reader should be prepared to ignore unrecognized data that goes beyond the definition of data that the reader understands.

When a track includes a VVC bitstream natively or resolves through 'subp' track references, VvcPtlRecord shall be present in the decoder configuration record. In addition, when ptl_present_flag is 0 in the decoder configuration record of a track, the track shall have an 'oref' track reference.

When the stream described in the VVC decoder configuration record is decoded, values of syntax elements of VvcPTRecord, chroma_format_idc, and bit_depth_minus8 may be valid for all parameter sets that are activated. In particular, the following restrictions may apply.

Profile indication general_profile_idc indicates the profile to which the stream associated with this configuration record conforms.

Tier indication general_tier_flag may indicate a tier equal to or greater than the highest tier indicated in all the parameter sets.

Each bit in general_constraint_info may be set only if all the parameter sets set the corresponding bit.

Level indication general_level_idc may indicate a level of capability equal to or greater than the highest level indicated for the highest tier in parameter sets.

In addition, the following constraints may be applied to chroma_format_idc.

If the value of sps_chroma_format_idc defined in ISO/IEC 23090-3 is the same in all SPSs referenced by NAL units of a track, chroma_format_idc shall be equal to sps_chroma_format_idc.

Otherwise, if ptl_present_flag is equal to 1, chroma_format_idc shall be equal to vps_ols_dpb_chroma_format[output_layer_set_idx] defined in ISO/IEC 23090-3.

Otherwise (that is, if the above conditions are not satisfied), chroma_format_idc is not present.

An explicit indication may be provided in the VVC decoder configuration record about the chroma format and bit depth as well as other important format information used by the VVC video elementary stream. If the two sequences differ in color space indications in their VUI information, two different VVC sample entries may be required.

Also, for example, in the VVC decoder configuration record, there is a set of arrays to carry initialization NAL units. The NAL unit types may be restricted to indicate DCI, VPS, SPS, PPS, prefix APS and prefix SEI NAL units only. NAL unit types reserved in ISO/IEC 23090-3 and the present disclosure may be defined in the future, and the reader may have to ignore arrays with reserved or disallowed values of NAL unit types.

Meanwhile, the arrays may be in the order of DCI, VPS, SPS, PPS, prefix APS, and prefix SEI.

The syntax of the above-described VVC decoder configuration record may be as shown in the table below.

TABLE 5

```
aligned(8) class VvcPTLRecord(num_sublayers) {
    unsigned int(8) num_bytes_constraint_info;
    unsigned int(7) general_profile_idc;
    unsigned int(1) general_tier_flag;
    unsigned int(8) general_level_idc;
    unsigned int(1) ptl_frame_only_constraint_flag;
    unsigned int(1) ptl_multilayer_enabled_flag;
    if (num_bytes_constraint_info > 0)
        unsigned int(8*num_bytes_constraint_ info - 2)
    general_constraint_info;   for (i=num_sublayers - 2; i >= 0; i--)
        unsigned int(1) ptl_sublayer_level_present_flag[i];
    for (j=num_sublayers; j <=8 && num_sublayers > 1; j++)
        bit(1) ptl_reserved_zero_bit = 0;
    for (i=num_sublayers-2; i >= 0; i--)
        if (ptl_sublayer_level_present[i])
            unsigned int(8) sublayer_level_idc[i];
```

TABLE 5-continued

```
    unsigned int(8) num_sub_profiles;
    for (j=0; j < num_sub_profiles; j++)
        unsigned int(32) general_sub_profile_idc;
}
aligned(8) class VvcDecoderConfigurationRecord {
    unsigned int(8) configurationVersion = 1;
    unsigned int(16) avgFrameRate;
    unsigned int(2) constantFrameRate;
    unsigned int(3) numTemporalLayers;
    unsigned int(2) lengthSizeMinusOne;
    unsigned int(1) ptl_present_flag;
    if (ptl_present_flag) {
        VvcPTLRecord(numTemporalLayers) track_ptl;
        unsigned int(16) output_layer_set_idx;
    }
    unsigned int(1) chroma_format_present_flag;
    if (chroma_format_present_flag)
        unsigned int(2) chroma_format_idc;
    else
        bit(2) reserved = '11'b;
    unsigned int(1) bit_depth_present_flag;
    if (bit_depth_present_flag)
        unsigned int(3) bit_depth_minus8;
    else
        bit(3) reserved = '111'b;
    unsigned int(1) reserved= '1'b;
    unsigned int(8) numOfArrays;
    for (j=0; j < numOfArrays; j++) {
        unsigned int(1) array_completeness;
        bit(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

In addition, semantics of the syntax of the VVC decoder configuration record may be as shown in the following table.

TABLE 6 general_profile_idc, general_tier_flag, general_sub_profile_idc, general_constraint_info, general_level_idc, ptl_frame_only_constraint_flag,ptl_multilayer_enabled_flag, sublayer_level_present, and sublayer_level_idc[i] contain the matching values for the fields general_profile_idc, general_tier_flag, general_sub_profile_idc, the bits in general_constraint_info( ), general_level_idc,ptl_multilayer_enabled_flag, ptl_frame_only_constraint_flag, sublayer_level_present, and sublayer_level_idc[i] as defined in ISO/IEC 23090-3, for the stream to which this configuration record applies.
avgFrameRate gives the average frame rate in units of frames/(256 seconds), for the stream to which this configuration record applies. Value 0 indicates an unspecified average frame rate.
constantFrameRate equal to 1 indicates that the stream to which this configuration record applies is of constant frame rate. Value 2 indicates that the representation of each temporal layer in the stream is of constant frame rate. Value 0 indicates that the stream may or may not be of constant frame rate.
numTemporalLayers greater than 1 indicates that the track to which this configuration record applies is temporally scalable and the contained number of temporal layers (also referred to as temporal sublayer or sublayer in ISO/IEC 23090-3) is equal to numTemporalLayers. Value 1 indicates that the track to which this configuration record applies is not temporally scalable. Value 0 indicates that it is unknown whether the track to which this configuration record applies is temporally scalable.
lengthSizeMinusOne plus 1 indicates the length in bytes of the NALUnitLength field in a VVC video stream sample in the stream to which this configuration record applies. For example, a size of one byte is indicated with a value of 0. The value of this field shall be one of 0, 1, or 3 corresponding to a length encoded with 1, 2, or 4 bytes, respectively.
ptl_present_flag equal to 1 specifies that the track contains a VVC bitstream corresponding to a specific output layer set. ptl_present_flag equal to 0 specifies that the track may not contain a VVC bitstream corresponding to a specific output layer set, but rather may contain one or more individual layers that do not form an output layer set or individual sublayers excluding the sublayer with TemporalId equal to 0.
num_sub_profiles defines the number of sub profiles indicated in the decoder configuration record.

TABLE 6-continued track_ptl specifies the profile, tier, and level of the output layer set represented by the VVC bitstream contained in the track.
output_layer_set_idx specifies the output layer set index of an output layer set represented by the VVC bitstream contained in the track. The value of output_layer_set_idx may be used as the value of the TargetOlsIdx variable provided by external means to the VVC decoder, as specified in ISO/IEC 23090-3, for decoding the bitstream contained in the track.
chroma_format_present_flag equal to 0 specifies that chroma_format_idc is not present. chroma_format_present_flag equal to 1 specifies that chroma_format_idc is present.
chroma_format_idc indicates the chroma format that applies to this track. The following constraints apply for chroma_format_idc:
 - If the value of sps_chroma_format_idc, as defined in ISO/IEC 23090-3, is the same in all SPSs referenced by the NAL units of the track, chroma_format_idc shall be equal to sps_chroma_format_idc.
 - Otherwise, if ptl_present_flag is equal to 1, chroma_format_idc shall be equal to vps_ols_dpb_chroma_format[output_layer_set_idx], as defined in ISO/IEC 23090-3.
   Otherwise, chroma_format_idc shall not be present.
bit_depth_present_flag equal to 0 specifies that bit_depth_minus8 is not present. bit_depth_present_flag equal to 1 specifies that bit_depth_minus8 is present.
bit_depth_minus8 indicates the bit depth that applies to this track. The following constraints apply for bit_depth_minus8:
 - If the value of sps_bitdepth_minus8, as defined in ISO/IEC 23090-3, is the same in all SPSs referenced by the NAL units of the track, bit_depth_minus8 shall be equal to sps_bitdepth_minus8.
 - Otherwise, if ptl_present_flag is equal to 1, bit_depth_minus8 shall be equal to vps_ols_dpb_bitdepth_minus8[ output_layer_set_idx], as defined in ISO/IEC 23090-3.
 - Otherwise, bit_depth_minus8 shall not be present.
numArrays indicates the number of arrays of NAL units of the indicated type(s).
array_completeness when equal to 1 indicates that all NAL units of the given type are in the following array and none are in the stream; when equal to 0 indicates that additional NAL units of the indicated type may be in the stream; the default and permitted values are constrained by the sample entry name.
NAL_unit_type indicates the type of the NAL units in the following array (which shall be all of that type); it takes a value as defined in ISO/IEC 23090-2; it is restricted to take one of the values indicating a DCI, VPS, SPS, PPS, APS, prefix SEI, or suffix SEI NAL unit.
numNalus indicates the number of NAL units of the indicated type included in the configuration record for the stream to which this configuration record applies. The SEI array shall only contain SEI messages of a 'declarative' nature, that is, those that provide information about the stream as a whole. An example of such an SEI could be a user-data SEI.
nalUnitLength indicates the length in bytes of the NAL unit.
nalUnit contains a DCI, VPS, SPS, PPS, APS or declarative SEI NAL unit, as specified in ISO/IEC 23090-3.

For example, referring to Table 6, the syntax elements general_profile_idc, general_tier_flag, general_sub_profile_idc, general_constraint_info, general_level_idc, ptl_frame_only_constraint_flag, ptl_multilayer_enabled_flag, sublayer_level_present and sublayer_level_idc[i] may include matching values of fields for a stream to which the VVC decoder configuration record, defined in ISO/IEC 23090-3, applies_general_profile_idc, general_tier_flag, general_sub_profile_idc, bits of general_constraint_info( ), general_level_idc, ptl_multilayer_enabled_flag, ptl_frame_only_constraint_flag, sublayer_level_present, and sublayer_level_idc[i]. Here, avgFrameRate may provide an average frame rate of a stream to which the VVC decoder configuration record is applied in units of frames/(256 seconds). A value of 0 may indicate an unspecified average frame rate.

Also, for example, referring to Table 6, the syntax element constantFrameRate may indicate a constant frame rate for the VVC decoder configuration record. For example, constantFrameRate equal to 1 may indicate that a stream to which the VVC decoder configuration record is applied is of a constant frame rate. A constantFrameRate equal to 2 may indicate that the representation of each temporal layer of the stream is of a constant frame rate. A constantFrameRate equal to 0 may indicate that the stream may or may not be of a constant frame rate.

Also, for example, referring to Table 6, the syntax element numTemporalLayers may indicate the number of temporal layers included in a track to which the VVC decoder configuration record is applied. For example, numTemporalLayers greater than 1 may indicate that the track to which the VVC decoder configuration record is applied is temporally scalable and the number of the temporal layers (referred to as temporal sublayers or sublayers in ISO/IEC 23090-3) included in the track is equal to numTemporalLayers. numTemporalLayers equal to 1 may indicate that a track to which the VVC decoder configuration record is applied is not temporally scalable. numTemporalLayers equal to 0 may indicate that it is unknown whether a track to which the VVC decoder configuration record is applied is temporally scalable.

Also, for example, referring to Table 6, the syntax element lengthSizeMinusOne plus 1 may indicate the length in bytes of the NALUnitLength field in the VVC video stream sample of the stream to which this configuration record is applied. For example, a size of one byte may be indicated by with a value of 0. The value of lengthSizeMinusOne may be one of 0, 1, or 3, corresponding to a length encoded as 1, 2, or 4 bytes, respectively.

Also, for example, referring to Table 6, the syntax element ptl_present_flag may indicate that a track includes a VVC bitstream corresponding to a specific output layer set, and thus may indicate whether or not PTL information is included. For example, ptl_present_flag equal to 1 may indicate that the track includes a VVC bitstream corresponding to a specific output layer set (specific OLS). ptl_present_flag equal to 0 may indicate that the track may not include a VVC bitstream corresponding to a specific OLS, but rather may include one or more individual layers that do not form an OLS or individual sublayers excluding the sublayer with TemporalId equal to 0.

Also, for example, referring to Table 6, the syntax element num_sub_profiles may define the number of sub profiles indicated in the VVC decoder configuration record.

Also, for example, referring to Table 6, the syntax element track_ptl may indicate a profile, tier, and level of an OLS indicated by a VVC bitstream included in a track.

Also, for example, referring to Table 6, the syntax element output_layer_set_idx may indicate an output layer set index of an output layer set indicated by a VVC bitstream included in a track. The value of output_layer_set_idx may be used as the value of the TargetOlsIdx variable provided by external means to the VVC decoder, as specified in ISO/IEC 23090-3, to decode the bitstream included in the track.

Also, for example, referring to Table 6, the syntax element chroma_format_present_flag may indicate whether chroma_format_idc is present. For example, chroma_format_present_flag equal to 0 may indicate that chroma_format_idc is not present. chroma_format_present_flag equal to 1 may indicate that chroma_format_idc is present.

Also, for example, referring to Table 6, the syntax element chroma_format_idc may indicate a chroma format applied to the track. For example, the following constraints may be applied to chroma_format_idc.
  If the value of sps_chroma_format_idc defined in ISO/IEC 23090-3 is the same in all SPSs referenced by NAL units of a track, chroma_format_idc shall be equal to sps_chroma_format_idc.
  Otherwise, if ptl_present_flag is equal to 1, chroma_format_idc shall be equal to vps_ols_dpb_chroma_format[output_layer_set_idx] defined in ISO/IEC 23090-3.
  Otherwise (i.e., if the above conditions are not satisfied), chroma_format_idc is not present.

Also, for example, referring to Table 6, the syntax element bit_depth_present_flag may indicate whether bit_depth_minus8 is present. For example, bit_depth_present_flag equal to 0 may indicate that bit_depth_minus8 is not present. bit_depth_present_flag equal to 1 may indicate that bit_depth_minus8 is present.

Also, for example, referring to Table 6, a syntax element bit_depth_minus8 may indicate a bit depth applied to the track. For example, the following constraints may be applied to bit_depth_minus8.
  If the value of sps_bitdepth_minus8 defined in ISO/IEC 23090-3 is the same in all SPSs referred to by NAL units of a track, bit_depth_minus8 shall be equal to sps_bitdepth_minus8.
  Otherwise, if ptl_present_flag is equal to 1, bit_depth_minus8 shall be equal to vps_ols_dpb_bitdepth_minus8[output_layer_set_idx] defined in ISO/IEC 23090-3.
  Otherwise (i.e., if the above conditions are not satisfied), bit_depth_minus8 is not present.

Also, for example, referring to Table 6, the syntax element numArrays may indicate the number of NAL unit arrays of the indicated type(s).

Also, for example, referring to Table 6, the syntax element array_completeness may indicate whether additional NAL units may be present in the stream. For example, array_completeness equal to 1 may indicate that all NAL units of a given type are in the following array and none are in the stream. Also, for example, array_completeness equal to 0 may indicate that additional NAL units of the indicated type may be in the stream. The default and permitted values may be constrained by the sample entry name.

Also, for example, referring to Table 6, the syntax element NAL_unit_type may indicate the type of NAL units in the following array (which shall be all of that type). NAL_unit_type may have a value defined in ISO/IEC 23090-2. In addition, NAL_unit_type may be restricted to have one of values indicating DCI, VPS, SPS, PPS, APS, prefix SEI or suffix SEI NAL unit.

Also, for example, referring to Table 6, the syntax element numNalus may indicate the number of NAL units of an indicated type included in the VVC decoder configuration record for a stream to which the VVC decoder configuration record is applied. An SEI array may include only SEI messages of a 'declarative' nature, that is, those that provide information on the stream as a whole. An example of such an SEI may be a user-data SEI.

Also, for example, referring to Table 6, the syntax element nalUnitLength may indicate the length in bytes of the NAL unit.

Also, for example, nalUnit may include DCI, VPS, SPS, PPS, APS or declarative SEI NAL unit specified in ISO/IEC 23090-3.

Meanwhile, in order to reconstruct an access unit from samples of multiple tracks carrying a multi-layer VVC bitstream, an operating point may be determined first. For example, when a VVC bitstream is represented by multiple VVC tracks, a file parser may identify the tracks needed for a chosen operating point as follows.

For example, the file parser may find all tracks with VVC sample entries. If the tracks include an 'oref' track reference for the same ID, that ID may be resolved to either a VVC track or an 'opeg' entity group. An operating point may be selected from an 'opeg' entity group or a 'vopi' sample group suitable for decoding capacity and application purposes.

When an 'opeg' entity group is present, it may indicate that a set of tracks exactly represents the selected operating point. Thus, a VVC bitstream may be reconstructed from the set of tracks and decoded.

In addition, when an 'opeg' entity group is not present (i.e., if a 'vopi' sample group is present), it may be discovered from the 'vopi' and 'linf' sample groups which set of tracks is needed for decoding the selected operating point.

In order to reconstruct a bitstream from multiple VVC tracks carrying a VVC bitstream, the target highest value TemporalId may need to be determined first. When a plurality of tracks include data for an access unit, the alignment of respective samples in the tracks may be performed based on the sample decoding times, that is, using the time-to-sample table without considering edit lists.

When a VVC bitstream is represented by multiple VVC tracks, the decoding times of the samples shall be such that if the tracks were combined into a single stream ordered by increasing the decoding time, the access unit order would be correct as specified in ISO/IEC 23090-3. Meanwhile, a sequence of access units may be reconstructed from respective samples in the required tracks according to the implicit restoration process described below. For example, the implicit reconstruction process of a VVC bitstream may be as follows.

For example, when an Operating Points Information sample group is present, a required track may be selected based on a layer and reference layers carrying as indicated in the operating point information and the layer information sample group.

Also, for example, when an operating point entity group is present, a required track may be selected based on information in OperatingPointGroupBox.

In addition, for example, when reconstructing a bitstream including a sublayer for which the VCL NAL units have TemporalId greater than 0, all lower sublayers (i.e., sublayers for which the VCL NAL units have smaller TemporalId) within the same layer are also included in the resulting bitstream, and the required track may be selected accordingly.

In addition, for example, when reconstructing an access unit, picture units (defined in ISO/IEC 23090-3) from samples having the same decoding time may be placed into the access unit in increasing order of nuh_layer_id value.

In addition, for example, when reconstructing an access unit with dependent layers and max_tid_il_ref_pics_plus1 is greater than 0, sublayers of layers for which the VCL NAL units have TemporalId less than or equal to max_tid_il_ref_pics_plus1−1 (indicated in operating point information sample group) within the same layer are also included in the resulting bitstream and the required track may be selected accordingly.

Also, for example, if a VVC track includes a 'subp' track reference, each picture unit may be reconstructed as specified in clause 11.7.3 of ISO/IEC 23090-3 with additional constraints on EOS and EOB NAL units specified below. The process of clause 11.7.3 of ISO/IEC 23090-3 may be repeated for each layer of the target operating point in increasing order of nuh_layer_id. Otherwise, each picture unit may be reconstructed as follows.

Reconstructed access units may be placed into the VVC bitstream in increasing order of decoding time. As described further below, duplicates of end of bitstream (EOB) and end of sequence (EOS) NAL units may be removed from the VVC bitstream.

Also, for example, for access units that are within the same coded video sequence of a VVC bitstream and that belong to different sublayers stored in multiple tracks, there may be one or more tracks including the EOS NAL unit with a particular nuh_layer_id value in the respective samples. In this case, only one of the EOS NAL units may be kept in the last of these access units (the one with the greatest decoding time) in the final reconstructed bitstream, may be placed after all NAL units except for the EOB NAL unit (if present) of the last of these access units, and other EOS NAL units may be discarded. Similarly, there may be one or more tracks including an EOB NAL unit in respective samples. In this case, only one of the EOB NAL units may be kept in the final reconstructed bitstream, may be placed at the end of the last of these access units, and other EOB NAL units may be discarded.

Also, for example, since a specific layer or sublayer may be represented by one or more tracks, when finding out the required track for an operating point, it may have to be selected among the set of tracks that conveys the specific layer or the sublayer altogether.

Further, for example, when the operating point entity group is not present, after selecting among tracks carrying the same layer or sublayer, the final required track may still collectively carry some layers or sublayers that do not belong to the target operation point. A bitstream reconstructed for a target operating point may not include the layers or sublayers that are carried in the final required tracks but do not belong to the target operating point.

Meanwhile, a design of signaling for the above-described operation point, the PTL, and the association between information on the PTL and samples and VVC sample entries may have the following problems.

Specifically, when signaling of profile, tier, and level information (ie, PTL information) is not present in the VVC decoder configuration record, signaling of information on the number of temporal sub-layers, whether to use average frame-rate, and whether to use constant frame-rate may not need to exist in the VVC decoder configuration record. Accordingly, when signaling of the above-described information is not required, it may be appropriate not to signal the information (i.e., information on the number of temporal sub-layers, average frame-rate, constant frame rate, etc.).

Accordingly, the present disclosure proposes a solution to the above problem. The proposed embodiments may be applied individually or in combination.

For example, when there is no profile, tier, and level (PTL) information in the sample entry, information related to an operation point may also not be present in the sample entry. That is, for example, when there is no profile, tier, and level (PTL) information in the sample entry, a method of preventing information related to an operation point from being present in the sample entry may also be proposed.

For example, when PTL information does not exist in the sample entry, information about the average frame rate may not exist in the sample entry. That is, when a value of ptl_present_flag in the VVC decoder configuration record is equal to 0, the syntax element avgFrameRate may not exist in the VVC decoder configuration record.

Alternatively, for example, when PTL information does not exist in the sample entry, information about a constant frame rate indication may not exist in the sample entry. That is, when a value of ptl_present_flag in the VVC decoder configuration record is equal to 0, the syntax element constantFrameRate may not exist in the VVC decoder configuration record.

Alternatively, for example, when PTL information does not exist in the sample entry, information about the number of temporal sublayers may not exist in the sample entry. That is, when a value of ptl_present_flag in the VVC decoder configuration record is equal to 0, the syntax element numTemporalLayers may not exist in the VVC decoder configuration record.

In addition, as an example, when an operation point used to configure an access units of a VVC bitstream to be decoded comes from information in a sample entry (i.e., based on numTemporalLayers and output_layer_set_idx), information on average frame rate related to the operation point and information on the constant frame rate indication (i.e., avgFrameRate and constantFrameRate) may be present in the sample entry. That is, for example, when the operating point is derived based on numTemporalLayers and output_layer_set_idx, a method may be proposed for information on the average frame rate related to the operating point and information on the constant frame rate indication (i.e., avgFrameRate and constantFrameRate) to be present in the sample entry.

In addition, as an example, an operating point used to configure an access units of a VVC bitstream to be decoded comes from information on an operating point sample group (i.e., based on numTemporalLayers and output_layer_set_idx of 'vopi'), information on an average frame rate related to the operating point and information on a constant frame rate indication (i.e., avgFrameRate and constantFrameRate) may be present in an i-th entry of 'vopi' related to the operation point. That is, for example, when the operating point is derived based on numTemporalLayers and output_layer_set_idx of 'vopi', a method may be proposed for information on an average frame rate related to the operating point and information on a constant frame rate indication (i.e., avgFrameRate and constantFrameRate) to be present in an i-th entry of 'vopi' related to the operating point.

In addition, as an example, the operation point used to configure an access units of the VVC bitstream to be decoded comes from information about the operation point sample group (i.e., based on numTemporalLayers and output_layer_set_idx of 'opeg'), information on the average frame rate related to the operating point and information on a constant frame rate indication may be present in the i-th entry of 'opeg' associated with the operating point. That is, for example, when an operation point is derived based on numTemporalLayers and output_layer_set_idx of 'opeg', a method may be proposed for information on the average frame rate related to the operation point and information on a constant frame rate indication to be present in an i-th entry of 'opeg' related to the operation point.

Also, as an example, ptl_present_flag may be replaced with a new flag called track_operating_point_present_flag to indicate whether a sample entry includes operation point information including all NAL units of a track related to the sample entry. That is, a method of replacing ptl_present_flag with track_operating_point_present_flag indicating whether a sample entry includes operation point information including all NAL units of a track related to the sample entry may be proposed.

For example, as an embodiment proposed in the present disclosure, a VVC decoder configuration record configured as shown in the following table may be proposed.

Table 7

Referring to Table 7 described above, when PTL information does not exist in the VVC decoder configuration record, that is, when the value of ptl_present_flag is 0, information on the average frame rate, information on the constant frame rate, information on the number of temporal layers, and OLS index in the VVC decoder configuration record may not be signaled. Here, the syntax element of the information on the average frame rate may be expressed as avgFrameRate, the syntax element of the information on the constant frame rate may be expressed as constantFrameRate, the syntax element of the information on the number of temporal layers may be expressed as numTemporalLayers, and the syntax element of the OLS index may be expressed as output_layer_set_idx.

In addition, the semantics of the syntax of the VVC decoder configuration record proposed in this embodiment may be as shown in the following table.

TABLE 8 general_profile_idc, general_tier_flag, general_sub_profile_idc,
  general_constraint_info, general_level_idc,
  ptl_frame_only_constraint_flag,ptl_multilayer_enabled_flag,
  sublayer_level_present, and sublayer_level_idc[i] contain the matching
  values for the fields general_profile_idc, general_tier_flag, general_sub_profile_idc, the
  bits in general_constraint_info( ), general_level_idc, ptl_multilayer_enabled_flag,
  ptl_frame_only_constraint_flag, sublayer_level_present, and sublayer_level_idc[i] as
  defined in ISO/IEC 23090-3, for the stream to which this configuration record applies.
lengthSizeMinusOne plus 1 indicates the length in bytes of the NALUnitLength field
  in a VVC video stream sample in the stream to which this configuration record applies.
  For example, a size of one byte is indicated with a value of 0. The value of this field shall
  be one of 0, 1, or 3 corresponding to a length encoded with 1, 2, or 4 bytes, respectively.
ptl_present_flag equal to 1 specifies that the track contains a VVC bitstream
  corresponding to a specific output layer set. ptl_present_flag equal to 0 specifies
  that the track may not contain a VVC bitstream corresponding to a specific output layer
  set, but rather may contain one or more individual layers that do not form an output
  layer set or individual sublayers excluding the sublayer with TemporalId equal to 0.
num_sub_profiles defines the number of sub profiles indicated in the decoder
  configuration record.
track_ptl specifies the profile, tier, and level of the output layer set represented by the
  VVC bitstream contained in the track.
avgFrameRate gives the average frame rate in units of frames/(256 seconds), for the
  stream to which this configuration record applies. Value 0 indicates an unspecified
  average frame rate.
constantFrameRate equal to 1 indicates that the stream to which this configuration
  record applies is of constant frame rate. Value 2 indicates that the representation of
  each temporal layer in the stream is of constant frame rate. Value 0 indicates that the
  stream may or may not be of constant frame rate.
numTemporalLayers greater than 1 indicates that the track to which this configuration
  record applies is temporally scalable and the contained number of temporal layers (also
  referred to as temporal sublayer or sublayer in ISO/IEC 23090-3) is equal to
  numTemporalLayers. Value 1 indicates that the track to which this configuration record
  applies is not temporally scalable. Value 0 indicates that it is unknown whether the
  track to which this configuration record applies is temporally scalable.
output_layer_set_idx specifies the output layer set index of an output layer set
  represented by the VVC bitstream contained in the track. The value of
  output_layer_set_idx may be used as the value of the TargetOlsIdx variable
  provided by external means to the VVC decoder, as specified in ISO/IEC 23090-3, for
  decoding the bitstream contained in the track.
chroma_format_present_flag equal to 0 specifies that chroma_format_idc is not
  present. chroma_format_present_flag equal to 1 specifies that
  chroma_format_idc is present.

TABLE 8-continued chroma_format_idc indicates the chroma format that applies to this track. The
  following constraints apply for chroma_format_idc:
    - If the value of sps_chroma_format_idc, as defined in ISO/IEC 23090-3, is the
      same in all SPSs referenced by the NAL units of the track,
      chroma_format_idc shall be equal to sps_chroma_format_idc.
    - Otherwise, if ptl_present_flag is equal to 1, chroma_format_idc
      shall    be    equal    to
      vps_ols_dpb_chroma_format[output_layer_set_idx],    as
      defined in ISO/IEC 23090-3.
    - Otherwise, chroma_format_idc shall not be present.
bit_depth_present_flag equal to 0 specifies that bit_depth_minus8 is not
  present. bit_depth_present_flag equal to 1 specifies that bit_depth_minus8
  is present.
bit_depth_minus8 indicates the bit depth that applies to this track. The following
  constraints apply for bit_depth_minus8:
    - If the value of sps_bitdepth_minus8, as defined in ISO/IEC 23090-3, is the
      same in all SPSs referenced by the NAL units of the track,
      bit_depth_minus8 shall be equal to sps_bitdepth_minus8.
    - Otherwise, if ptl_present_flag is equal to 1, bit_depth_minus8
      shall    be    equal    to
      vps_ols_dpb_bitdepth_minus8[ output_layer_set_idx], as
      defined in ISO/IEC 23090-3.
    - Otherwise, bit_depth_minus8 shall not be present.
numArrays indicates the number of arrays of NAL units of the indicated type(s).
array_completeness when equal to 1 indicates that all NAL units of the given type are
  in the following array and none are in the stream; when equal to 0 indicates that
  additional NAL units of the indicated type may be in the stream; the default and
  permitted values are constrained by the sample entry name.
NAL_unit_type indicates the type of the NAL units in the following array (which shall be
  all of that type); it takes a value as defined in ISO/IEC 23090-2; it is restricted to take
  one of the values indicating a DCI, VPS, SPS, PPS, APS, prefix SEI, or suffix SEI NAL unit.
numNalus indicates the number of NAL units of the indicated type included in the
  configuration record for the stream to which this configuration record applies. The SEI
  array shall only contain SEI messages of a 'declarative' nature, that is, those that provide
  information about the stream as a whole. An example of such an SEI could be a user-
  data SEI.
nalUnitLength indicates the length in bytes of the NAL unit.
nalUnit contains a DCI, VPS, SPS, PPS, APS or declarative SEI NAL unit, as specified in
  ISO/IEC 23090-3.

For example, referring to Table 8 described above, the syntax element avgFrameRate may provide an average frame rate for a stream to which the VVC decoder configuration record is applied in units of frames/(256 seconds). A value of 0 may indicate an unspecified average frame rate. That is, when the value of avgFrameRate is 0, avgFrameRate may indicate an unspecified average frame rate.

Also, for example, referring to Table 8 described above, the syntax element constantFrameRate may indicate a constant frame rate for the VVC decoder configuration record. For example, constantFrameRate being equal to 1 may indicate that a stream to which the VVC decoder configuration record is applied is the constant frame rate. A constantFrameRate being equal to a value of 2 may indicate that the representation of each temporal layer of the stream is the constant frame rate. A constantFrameRate being equal to a value of 0 may indicate that the stream may or may not be of a constant frame rate.

Also, for example, referring to Table 8 described above, the syntax element numTemporalLayers may indicate the number of temporal layers included in a track to which the VVC decoder configuration record is applied. For example, if numTemporalLayers is greater than 1, the track to which the VVC decoder configuration record is applied is temporally scalable, and the temporal layer included in the track (temporal sublayer or sublayer in ISO/IEC 23090-3), also referred to as) may indicate that the number is equal to numTemporalLayers. numTemporalLayers being equal to the value 1 may indicate that the track to which the VVC decoder configuration record is applied is not temporally scalable. numTemporalLayers being equal to the value 0 may indicate that it is not known whether the track to which the VVC decoder configuration record is applied is temporally scalable.

In addition, for example, as another embodiment proposed in the present disclosure, a VVC decoder configuration record configured as shown in the following table may be proposed.

TABLE 9

```
aligned(8) class VvcDecoderConfigurationRecord {
    unsigned int(8) configurationVersion = 1;
    bit(5) reserved = '11111'b;
    unsigned int(2) lengthSizeMinusOne;
    unsigned int(1) track_operating_point present_flag;
    if (track_operating_point_present_flag) {
        unsigned int(16) avgFrameRate;
        unsigned int(2) constantFrameRate;
        unsigned int(3) numTemporalLayers;
        bit(3) reserved = '111'b;
        unsigned int(16) output_layer_set_idx;
        VvcPTLRecord(numTemporalLayers) track_ptl;
    }
    unsigned int(1) chroma_format_present_flag;
    if (chroma_format_present_flag)
        unsigned int(2) chroma_format_idc;
    else
        bit(2) reserved = '11'b;
    unsigned int(1) bit_depth_present_flag;
    if (bit_depth_present_flag)
        unsigned int(3) bit_depth_minus8;
    else
        bit(3) reserved = '111'b;
    unsigned int(1) reserved= '1'b;
    unsigned int(8) numofArrays;
```

TABLE 9-continued

```
    for (j=0; j < numOfArrays; j++) {
        unsigned int(1) array_completeness;
        bit(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

Referring to Table 9 described above, the VVC decoder configuration record may include track_operating_point_present_flag instead of ptl_present_flag, which is a flag indicating whether the PTL information exists. That is, track_operating_point_present_flag may be signaled instead of ptl_present_flag in the VVC decoder configuration record. According to this embodiment, instead of ptl_present_flag indicating whether a track includes a VVC bitstream corresponding to a specific OLS, track_operating_point_present_flag indicating whether a track includes a VVC bitstream corresponding to a specific operating point may be signaled.

Referring to Table 9 described above, when PTL information does not exist in the VVC decoder configuration record, that is, when the value of track_operating_point_present_flag is 0, information on the average frame rate, information on constant frame rate, information on the number of temporal layers, and OLS index may not be signaled in the VVC decoder configuration record. Here, the syntax element of the information on the average frame rate may be expressed as avgFrameRate, the syntax element of the information on the constant frame rate may be expressed as constantFrameRate, the syntax element of the information on the number of temporal layers may be expressed as numTemporalLayers, and the syntax element of the OLS index may be expressed as output_layer_set_idx.

In addition, the semantics of the syntax of the VVC decoder configuration record proposed in this embodiment may be as shown in the following table.

TABLE 10 general_profile_idc, general_tier_flag, general_sub_profile_idc,
    general_constraint_info, general_level_idc,
    ptl_frame_only_constraint_flag,ptl_multilayer_enabled_flag,
    sublayer_level_present, and sublayer_level_idc[i] contain the matching
    values for the fields general_profile_idc, general_tier_flag, general_sub_profile_idc, the
    bits in general_constraint_info( ), general_level_idc, ptl_multilayer_enabled_flag,
    ptl_frame_only_constraint_flag, sublayer_level_present, and sublayer_level_idc[i] as
    defined in ISO/IEC 23090-3, for the stream to which this configuration record applies.
lengthSizeMinusOne plus 1 indicates the length in bytes of the NALUnitLength field
    in a VVC video stream sample in the stream to which this configuration record applies.
    For example, a size of one byte is indicated with a value of 0. The value of this field shall
    be one of 0, 1, or 3 corresponding to a length encoded with 1, 2, or 4 bytes, respectively.
track_operating_point_present_flag equal to 1 specifies that the track contains a
    VVC bitstream corresponding to a specific operating point.
    track_perating_point_present_flag equal to 0 specifies that the track may
    not contain a VVC bitstream corresponding to a specific operating point, but rather may
    contain one or more individual layers that do not form an output layer set or individual
    sublayers excluding the sublayer with TemporalId equal to 0.
num_sub_profiles defines the number of sub profiles indicated in the decoder
    configuration record.
track_ptl specifies the profile, tier, and level of the output layer set represented by the
    VVC bitstream contained in the track.
avgFrame Rate gives the average frame rate in units of frames/(256 seconds), for the
    stream to which this configuration record applies. Value 0 indicates an unspecified
    average frame rate.
constantFrameRate equal to 1 indicates that the stream to which this configuration
    record applies is of constant frame rate. Value 2 indicates that the representation of
    each temporal layer in the stream is of constant frame rate. Value 0 indicates that the
    stream may or may not be of constant frame rate.
numTemporalLayers greater than 1 indicates that the track to which this configuration
    record applies is temporally scalable and the contained number of temporal layers (also
    referred to as temporal sublayer or sublayer in ISO/IEC 23090-3) is equal to
    numTemporalLayers. Value 1 indicates that the track to which this configuration record
    applies is not temporally scalable. Value 0 indicates that it is unknown whether the
    track to which this configuration record applies is temporally scalable.
output_layer_set_idx specifies the output layer set index of an output layer set
    represented by the VVC bitstream contained in the track. The value of
    output_layer_set_idx may be used as the value of the TargetOlsIdx variable
    provided by external means to the VVC decoder, as specified in ISO/IEC 23090-3, for
    decoding the bitstream contained in the track.
chroma_format_present_flag equal to 0 specifies that chroma_format_idc is not
    present. chroma_format_present_flag equal to 1 specifies that
    chroma_format_idc is present.
chroma_format_idc indicates the chroma format that applies to this track. The
    following constraints apply for chroma_format_idc:
        - If the value of sps_chroma_format_idc, as defined in ISO/IEC 23090-3, is the
            same in all SPSs referenced by the NAL units of the track,
            chroma_format_idc shall be equal to sps_chroma_format_idc.
            Otherwise, if ptl_present_flag is equal to 1, chroma_format_idc TABLE 10-continued

- shall be equal to vps_ols_dpb_chroma_format[output_layer_set_idx], as defined in ISO/IEC 23090-3. as
- Otherwise, chroma_format_idc shall not be present.

bit_depth_present_flag equal to 0 specifies that bit_depth_minus8 is not present. bit_depth present_flag equal to 1 specifies that bit_depth_minus8 is present.

bit_depth_minus8 indicates the bit depth that applies to this track. The following constraints apply for bit_depth_minus8:
- If the value of sps_bitdepth_minus8, as defined in ISO/IEC 23090-3, is the same in all SPSs referenced by the NAL units of the track, bit_depth_minus8 shall be equal to sps_bitdepth_minus8.
- Otherwise, if ptl_present_flag is equal to 1, bit_depth_minus8 shall be equal to vps_ols_dpb_bitdepth_minus8[ output_layer_set_idx], as defined in ISO/IEC 23090-3.
- Otherwise, bit_depth_minus8 shall not be present.

numArrays indicates the number of arrays of NAL units of the indicated type(s).

array_completeness when equal to 1 indicates that all NAL units of the given type are in the following array and none are in the stream; when equal to 0 indicates that additional NAL units of the indicated type may be in the stream; the default and permitted values are constrained by the sample entry name.

NAL_unit_type indicates the type of the NAL units in the following array (which shall be all of that type); it takes a value as defined in ISO/IEC 23090-2; it is restricted to take one of the values indicating a DCI, VPS, SPS, PPS, APS, prefix SEI, or suffix SEI NAL unit.

numNalus indicates the number of NAL units of the indicated type included in the configuration record for the stream to which this configuration record applies. The SEI array shall only contain SEI messages of a 'declarative' nature, that is, those that provide information about the stream as a whole. An example of such an SEI could be a user-data SEI.

nalUnitLength indicates the length in bytes of the NAL unit.

nalUnit contains a DCI, VPS, SPS, PPS, APS or declarative SEI NAL unit, as specified in ISO/IEC 23090-3.

For example, referring to Table 10 described above, the syntax element track_operating_point_present_flag may indicate whether a track for a VVC decoder configuration record includes a VVC bitstream corresponding to a specific operating point. For example, track_operating_point_present_flag equal to 1 may indicate that the track includes a VVC bitstream corresponding to a specific operating point. Also, for example, track_operating_point_present_flag being equal to 0 may indicate that a track may not include a VVC bitstream corresponding to a particular operation point, but rather may indicate that one or more individual layers that do not form an Output Layer Set (OLS) or one or more individual sublayers other than a sublayer having a TemporalId of 0 may be included.

Figure 4:
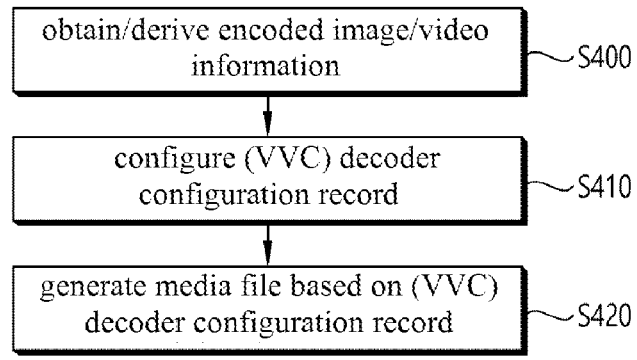
FIG. 4 exemplarily illustrates a method of generating a media file to which an embodiment proposed in the present disclosure is applied.

FIG. 4 exemplarily illustrates a method of generating a media file to which an embodiment proposed in the present disclosure is applied.

Referring to FIG. 4, a first device may obtain/derive encoded image/video information (S400). For example, the first device may represent a transmission end, an encoding end, or a media file generating end. For example, the first device may obtain encoded image/video information through a network or a (digital) storage medium. Here, the network may include a broadcasting network and/or a communication network, and the digital storage medium may include various storage media such as USB, SD, CD, DVD, Blu-ray, HDD, SSD and etc. In addition, the first device may include an encoder and derive the encoded image/video information.

The first device may configure a (VVC) decoder configuration record (S410). For example, the first device may configure a (VVC) decoder configuration record for the encoded video/video information according to the above-described embodiment.

Subsequently, the first device may generate a media file based on the (VVC) decoder configuration record (S420).

Figure 5:
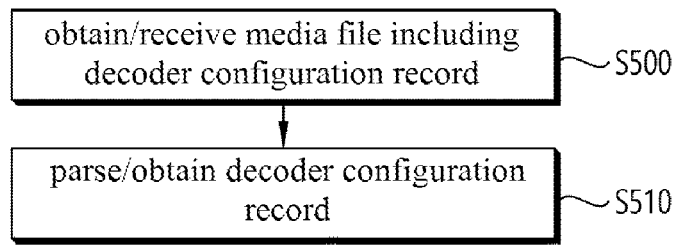
FIG. 5 exemplarily illustrates a method of decoding a media file generated by applying an embodiment proposed in the present disclosure.

FIG. 5 exemplarily illustrates a method of decoding a media file generated by applying an embodiment proposed in the present disclosure.

A second device may acquire/receive a media file including a decoder configuration record (S500). For example, the second device may represent a reception end, a decoding end, or a rendering end.

For example, a media file may include information described in Table 1 and/or Table 3. Also, for example, a media file may contain a decoder configuration record. The decoder configuration record may include information/fields of the embodiment(s) proposed in the present disclosure.

The second device may parse/obtain the decoder configuration record (S510). The second device may parse/obtain a decoder configuration record included in the media file. For example, the second device may derive an operating point based on the decoder configuration record and configure an access unit of a decoded VVC bitstream. Image/video decoding may be performed based on the access unit.

Figure 6:
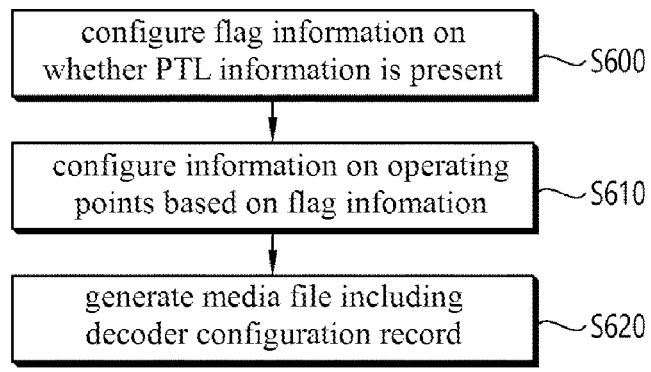
FIG. 6 briefly illustrates a method of generating a media file according to another embodiment of the present disclosure.

FIG. 6 briefly illustrates a method of generating a media file according to another embodiment of the present disclosure. The method disclosed in FIG. 6 may be performed by a media file generation device disclosed in FIG. 7. The media file generation device may represent the above-described first device. Specifically, for example, S600 to S610 of FIG. 6 may be performed by an image processing unit of the media file generating device, and S620 may be performed by a media file generating unit of the media file generation device. Also, although not shown, a process of encoding a bitstream including image information may be performed by an encoder of the media file generation device.

The media file generating device configures flag information on whether PTL (Profile Tier Level, PTL) information exists (S600). For example, the media file generating device may derive encoded video information, and configure a decoder configuration record for a bitstream including the encoded video information, and generate a media file including the decoder configuration record. For example, the media file generating device may derive encoded image information, determine whether PTL information exists based on the encoded image information, and configure the flag information based on a result of the determination. For example, the media file generating device may obtain the encoded image information through a network or a (digital) storage medium. Here, the network may include a broadcasting network and/or a communication network, and the digital storage medium may include various storage media such as USB, SD, CD, DVD, Blu-ray, HDD, SSD and etc. Alternatively, for example, the media file generating device may include an encoder and derive the encoded image information.

The media file generating device may configure flag information indicating whether the PTL information is present based on the encoded image information.

For example, the flag information may be the aforementioned PTL presence flag. For example, the flag information may indicate whether the PTL information is present in a track. For example, the flag information being equal to 1 may indicate that the PTL information is present. Also, for example, the flag information being equal to 0 may indicate that the PTL information is not present.

Also, for example, the flag information may indicate that a track includes a (VVC) bitstream corresponding to a specific Output Layer Set (OLS). For example, flag information being equal to 1 may indicate that a track includes a VVC bitstream corresponding to a specific output layer set. In addition, for example, flag information being equal to 0 may indicate that a track may not include a VVC bitstream corresponding to a specific output layer set, but rather may indicate that one or more individual layers that do not form an Output Layer Set (OLS) or one or more individual sublayers other than a sublayer having a TemporalId of 0 may be included.

Also, for example, the flag information may indicate that a track includes a (VVC) bitstream corresponding to a specific operation point. For example, flag information being equal to 1 may indicate that the track includes a VVC bitstream corresponding to a specific operating point. In addition, for example, flag information being equal to 0 may indicate that a track may not contain a VVC bitstream corresponding to a particular operation point, but rather may indicate that one or more individual layers that do not form an Output Layer Set (OLS) or one or more individual sublayers other than a sublayer having a TemporalId of 0 may be included. Here, the track may indicate a track to which a decoder configuration record including the flag information is applied.

A syntax element of the flag information may be the above-described ptl_present_flag or track_operating_point_present_flag.

The media file generating device configures information on operating points based on the flag information (S610). The media file generating device may configure information on operating points based on the flag information. For example, when the flag information indicates that the PTL information is present, the media file generating device may configure information on the operation points, and when the flag information indicates that the PTL information is not present, the media file generating device may not configure information on the operating points. That is, for example, when a value of the flag information is 1, the media file generating device may configure information on the operating points, and when the value of the flag information is 0, the media file generating device may not configure information on the operation points.

For example, information on the operating points may be configured in the decoder configuration record based on the flag information being equal to 1. That is, for example, when the value of the flag information is 1, the information on the operating points may be configured in the decoder configuration record. Also, for example, information on the operation points may not be configured in the decoder configuration record based on the flag information equal to 0. That is, for example, when the value of the flag information is 0, the information on the operating points may not be configured in the decoder configuration record.

Here, for example, the information on the operating points may include information on an average frame rate, information on a constant frame rate, and information on the number of temporal sublayers.

For example, the information on the average frame rate may indicate an average frame rate (in units of frames/(256 seconds)) for a stream to which the decoder configuration record is applied. A value of 0 may indicate an unspecified average frame rate. That is, when the value of the information on the average frame rate is 0, the information on the average frame rate may indicate an unspecified average frame rate.

Also, for example, the information on the constant frame rate may indicate a constant frame rate for the decoder configuration record. For example, the information on the constant frame rate may indicate whether or not the constant frame rate is used. For example, when a value of the information on the constant frame rate is 1, the information on the constant frame rate may indicate that a stream to which the decoder configuration record is applied has a constant frame rate. Also, for example, when the value of the information on the constant frame rate is 2, the information on the constant frame rate may indicate that the representation of each temporal layer of the stream is a constant frame rate. Also, for example, when the value of the information on the constant frame rate is 0, the information on the constant frame rate may indicate that the stream may or may not have a constant frame rate.

Also, for example, the information on the number of temporal sublayers may indicate the number of temporal layers included in a track for the decoder configuration record. For example, when a value of the information on the number of temporal sublayers is greater than 1, the information on the number of temporal sublayers may indicate that a track for the decoder configuration record is temporally scalable and the number of temporal layers included in the track is equal to the value of the information on the number of temporal sublayers. Also, for example, when the value of the information on the number of temporal sublayers is 1, the information on the number of temporal sublayers may indicate that the track for the decoder configuration record is not temporally scalable. Also, for example, when the value of the information on the number of temporal sublayers is 0, the information on the number of temporal sublayers may indicate that whether the track for the decoder configuration record is temporally scalable is not known.

For example, the syntax element of the information on the average frame rate may be avgFrameRate, the syntax element of the information on the constant frame rate may be constantFrameRate, and the syntax element of the information on the number of temporal layers may be numTemporalLayers.

Alternatively, for example, when an operation point used to construct an access unit of a bitstream is derived based on information in a sample entry or an operation point sample group, the media file generating device may configure the operation point information on the operation point in a sample entry or operation point sample group including information from which the operation point information is derived.

For example, when an operation point used to configure an access unit of a bitstream is derived based on information in a sample entry, the media file generating device may configure information on the operation point in the sample entry. That is, for example, when an operation point used to configure an access unit of a bitstream is derived based on information in a sample entry, information on the operation point may be present in the sample entry. Here, for example, the information in the sample entry may include information on the number of temporal layers and an OLS index. A syntax element of the information on the number of temporal layers may be numTemporalLayers, and a syntax element of the OLS index may be output_layer_set_idx. Also, for example, the information on the operating point may include information on an average frame rate related to the operating point and information on a constant frame rate related to the operating point. A syntax element of information on the average frame rate may be avgFrameRate, and a syntax element of information on the constant frame rate may be constantFrameRate.

Alternatively, for example, when an operation point used to configure an access unit of a bitstream is derived based on information in an operation point sample group, the media file generating device may configure information on the operation point in the entry for the operation point of the operation point sample group. That is, for example, when an operation point used to configure an access unit of a bitstream is derived based on information in an operation point sample group, the information on the operation point may be present in the entry for the operation point in the operation point sample group. Here, for example, the operating point sample group may be a sample group with a grouping type of 'vopi' or an entity group with a grouping type of 'opeg'. Also, for example, the information in the operating point sample group may include information on the number of temporal layers and an OLS index. A syntax element of the information on the number of temporal layers may be numTemporalLayers, and a syntax element of the OLS index may be output_layer_set_idx. Also, for example, the information on the operating point may include information on an average frame rate related to the operating point and information on a constant frame rate related to the operating point. A syntax element of information on the average frame rate may be avgFrameRate, and a syntax element of information on the constant frame rate may be constantFrameRate.

Meanwhile, for example, the media file generating device may configure an OLS index based on the flag information. For example, when the flag information indicates that the PTL information exists, the media file generating device may configure the OLS index, and, when the flag information indicates that the PTL information does not exist, the media file generating device may not configure the OLS index. That is, for example, when a value of the flag information is 1, the media file generating device may configure the OLS index, and, when the value of the flag information is 0, the media file generating device may not configure the OLS index. For example, the OLS index may be configured in the decoder configuration record based on the flag information being equal to 1. That is, for example, when the value of the flag information is 1, the OLS index may be configured in the decoder configuration record. Also, for example, the OLS index may not be configured in the decoder configuration record based on the flag information being equal to 0. That is, for example, when the value of the flag information is 0, the OLS index may not be configured in the decoder configuration record.

Here, for example, the OLS index may indicate an OLS index of an OLS indicated by a (VVC) bitstream included in a track. That is, the OLS index may indicate an OLS indicated by a VVC bitstream included in a track. The value of the OLS index may be used as a value of a target OLS index to decode a bitstream included in a track. The syntax element of the OLS index may be the aforementioned output_layer_set_idx.

Also, for example, the media file generating device may configure PTL information based on the flag information. For example, when the flag information indicates that the PTL information exists, the media file generating device may configure the PTL information, and, when the flag information indicates that the PTL information does not exist, the media file generating device may not configure the PTL information. That is, for example, when a value of the flag information is 1, the media file generating device may configure the PTL information, and when the value of the flag information is 0, the media file generating device may not configure the PTL information. For example, the PTL information may be configured in the decoder configuration record based on the flag information being equal to 1. That is, for example, when the value of the flag information is 1, the PTL information may be configured in the decoder configuration record. Also, for example, the PTL information may not be configured in the decoder configuration record based on the flag information being equal to 0. That is, for example, when the value of the flag information is 0, the PTL information may not be configured in the decoder configuration record.

Here, for example, the PTL information may include a PTL record and/or a PTL index. For example, the PTL index may indicate a profile, tier, and level structure of an OLS represented by a (VVC) bitstream included in a track. For example, the PTL index may indicate a profile, tier, and level structure of an OLS represented by a bitstream in a track. Also, for example, the PTL record may include parameters for a profile, tier, and level structure. The profile, tier and level structure may be referred to as a PTL structure.

The media file generating device generates a media file including a decoder configuration record (S620). The media file generating device may generate a media file including a decoder configuration record. Meanwhile, for example, the decoder configuration record may be called a VVC decoder configuration record.

For example, the decoder configuration record may include flag information about whether the PTL information exists. Also, for example, information on the operation points may be configured in the decoder configuration record based on the flag information being equal to 1. That is, for example, when a value of the flag information is 1, the information on the operating points may be configured in the decoder configuration record. Also, for example, the media file may include sample entries and/or operation point sample groups. For example, when an operation point used to construct an access unit of a bitstream is derived based on information in a sample entry or an operation point sample group, the information on the operation point may be configured in a sample entry including information from which the operation point is derived or an entry for that operation point in an operation point sample group. Also, for example, the OLS index and/or the PTL information may be configured in the decoder configuration record based on the flag information being equal to 1. That is, for example, when the value of the flag information is 1, the PTL information may be configured in the decoder configuration record.

Meanwhile, although not shown, the media file generation device may store the generated media file in a (digital) storage medium or transmit the generated media file to a media file processing device through a network or a (digital) storage medium. Here, the network may include a broadcasting network and/or a communication network, and the digital storage medium may include various storage media such as USB, SD, CD, DVD, Blu-ray, HDD, SSD and etc.

Figure 7:
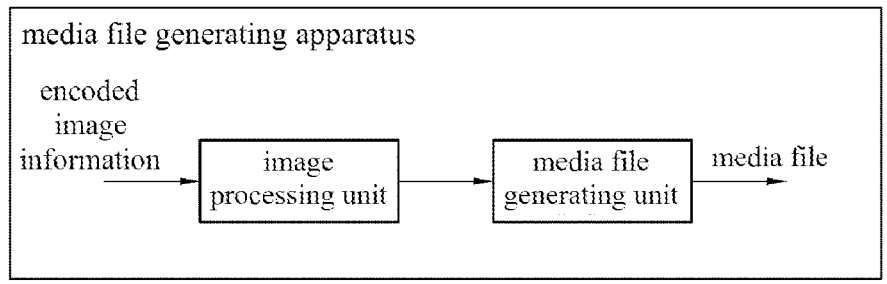
FIG. 7 briefly illustrates a media file generating apparatus according to the present disclosure.

FIG. 7 briefly illustrates a media file generating apparatus according to the present disclosure. The method disclosed in FIG. 6 may be performed by the media file generation device disclosed in FIG. 7. Specifically, for example, the image processing unit of the media file generation device of FIG. 7 may perform S600 to S610, and the media file generation unit of the media file generation device of FIG. 7 may perform S620. Also, although not shown, a process of encoding a bitstream including image information may be performed by an encoder of the media file generation device.

Figure 8:
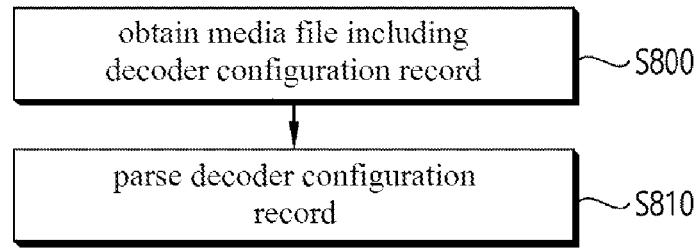
FIG. 8 briefly illustrates a method of processing a media file according to an embodiment of the present disclosure.

FIG. 8 briefly illustrates a method of processing a media file according to an embodiment of the present disclosure. The method disclosed in FIG. 8 may be performed by the media file processing device disclosed in FIG. 9. The media file processing device may represent the aforementioned second device. Specifically, for example, S800 of FIG. 8 may be performed by the receiving unit of the media file processing device, and S810 may be performed by the media file processing unit of the media file processing device. Also, although not shown, a process of decoding a bitstream based on a decoder configuration record may be performed by the decoder of the media file processing device.

The media file processing device obtains a media file including a decoder configuration record (S800). For example, the media file processing device may obtain the media file including the decoder configuration record through a network or a (digital) storage medium. Here, the network may include a broadcasting network and/or a communication network, and the digital storage medium may include various storage media such as USB, SD, CD, DVD, Blu-ray, HDD, SSD and etc.

The media file processing device parses the decoder configuration record (S810). For example, the media file processing device may parse/derive the decoder configuration record.

Specifically, for example, the decoder configuration record may include flag information on whether Profile Tier Level (PTL) information exists. That is, the media file processing device may parse the flag information included in the decoder configuration record.

Also, for example, the media file processing apparatus may parse information on operating points based on the flag information.

For example, when the flag information indicates that the PTL information exists, the media file processing device may parse information on the operating points from the decoder configuration record, and, when the flag information indicates that the PTL information does not exist, the media file generating device may not parse the information about the operating points in the decoder configuration record. That is, for example, when a value of the flag information is 1, the media file processing device may parse the information on the operation points in the decoder configuration record, and when the value of the flag information is 0, the media file processing device may not parse the information on the operating points in the decoder configuration record.

For example, information on the operation points may be configured/included in the decoder configuration record based on the flag information being equal to 1. That is, for example, when the value of the flag information is 1, the information on the operating points may be configured/included in the decoder configuration record. Also, for example, information on the operation points may not be configured/included in the decoder configuration record based on the flag information being equal to 0. That is, for example, when the value of the flag information is 0, the information on the operating points may not be configured/included in the decoder configuration record.

Here, for example, the information on the operating points may include information on an average frame rate, information on a constant frame rate, and information on the number of temporal sublayers.

For example, the information on the average frame rate may indicate an average frame rate (in units of frames/(256 seconds)) for a stream to which the decoder configuration record is applied. A value of 0 may indicate an unspecified average frame rate. That is, when the value of the information on the average frame rate is 0, the information on the average frame rate may indicate an unspecified average frame rate.

Also, for example, the information on the constant frame rate may indicate a constant frame rate for the decoder configuration record. For example, the information on the constant frame rate may indicate whether or not the constant frame rate is used. For example, when the value of the information on the constant frame rate is 1, the information on the constant frame rate may indicate that a stream to which the decoder configuration record is applied has a constant frame rate. Also, for example, when the value of the information on the constant frame rate is 2, the information on the constant frame rate may indicate that the representation of each temporal layer of the stream is a constant frame rate. Also, for example, when the value of the information on the constant frame rate is 0, the information on the constant frame rate may indicate that the stream may or may not have a constant frame rate.

Also, for example, the information on the number of temporal sublayers may indicate the number of temporal layers included in a track for the decoder configuration record. For example, when the value of the information on the number of temporal sublayers is greater than 1, the information on the number of temporal sublayers may indicate that a track for the decoder configuration record is temporally scalable, and the number of temporal layers included in the track is equal to the value of the information on the number of temporal sublayers. Also, for example, when the value of the information on the number of temporal sublayers is 1, the information on the number of temporal sublayers may indicate that the track for the decoder configuration record is not temporally scalable. Also, for example, when the value of the information on the number of temporal sublayers is 0, the information on the number of temporal sublayers may indicate that whether the track for the decoder configuration record is temporally scalable is not known.

For example, the syntax element of the information on the average frame rate may be avgFrameRate, the syntax element of the information on the constant frame rate may be constantFrameRate, and the syntax element of the information on the number of temporal layers may be numTemporalLayers.

Alternatively, for example, the media file may include a sample entry or an operation point sample group, and, when an operation point used to configure an access unit of a bitstream is derived based on information in a sample entry or an operation point sample group, the media file processing device may parse information about the operation point from the sample entry or operation point sample group including information from which the operation point is derived.

For example, the media file may include a sample entry, and when an operation point used to configure an access unit of a bitstream is derived based on information in the sample entry, the media file processing device may parse information on the operation point from the sample entry. That is, for example, when an operation point used to configure an access unit of a bitstream is derived based on information in a sample entry, information on the operation point may exist in the sample entry. Here, for example, the information in the sample entry may include information on the number of temporal layers and an OLS index. A syntax element of the information on the number of temporal layers may be numTemporalLayers, and a syntax element of the OLS index may be output_layer_set_idx. Also, for example, the information on the operating point may include information on an average frame rate related to the operating point and information on a constant frame rate related to the operating point. A syntax element of information on the average frame rate may be avgFrameRate, and a syntax element of information on the constant frame rate may be constantFrameRate.

Alternatively, for example, the media file may include an operation point sample group, and, when an operation point used to configure an access unit of a bitstream is derived based on information in the operation point sample group, the media file processing device may parse information on the operation point from an entry for the operation point of the operation point sample group. That is, for example, when an operation point used to configure an access unit of a bitstream is derived based on information in an operation point sample group, the information on the operation point may be present in the entry for the operation point in the operation point sample group. Here, for example, the operating point sample group may be a sample group with a grouping type of 'vopi' or an entity group with a grouping type of 'opeg'. Also, for example, the information in the operating point sample group may include information on the number of temporal layers and an OLS index. A syntax element of the information on the number of temporal layers may be numTemporalLayers, and a syntax element of the OLS index may be output_layer_set_idx. Also, for example, the information on the operating point may include information on an average frame rate related to the operating point and information on a constant frame rate related to the operating point. A syntax element of information on the average frame rate may be avgFrameRate, and a syntax element of information on the constant frame rate may be constantFrameRate.

Meanwhile, for example, the media file processing device may parse the OLS index based on the flag information. For example, when the flag information indicates that the PTL information exists, the media file processing device may parse the OLS index from the decoder configuration record. When the flag information indicates that the PTL information does not exist, the media file processing device may not parse the OLS index in the decoder configuration record. That is, for example, when the value of the flag information is 1, the media file processing device may parse the OLS index from the decoder configuration record, and when the value of the flag information is 0, the media file processing device may not parse the OLS index in the decoder configuration record. For example, the OLS index may be configured/included in the decoder configuration record based on the flag information being equal to 1. That is, for example, when the value of the flag information is 1, the OLS index may be configured/included in the decoder configuration record. Also, for example, the OLS index may be not configured/included in the decoder configuration record based on the flag information being equal to 0. That is, for example, when the value of the flag information is 0, the OLS index may not be configured/included in the decoder configuration record.

Here, for example, the OLS index may indicate an OLS index of an OLS indicated by a (VVC) bitstream included in a track. That is, the OLS index may indicate an OLS indicated by a VVC bitstream included in a track. The value of the OLS index may be used as a value of a target OLS index to decode a bitstream included in a track. The syntax element of the OLS index may be the aforementioned output_layer_set_idx.

Also, for example, the media file processing device may parse PTL information from the decoder configuration record based on the flag information. For example, when the flag information indicates that the PTL information exists, the media file processing device may parse the PTL information from the decoder configuration record. And, when the flag information indicates that the PTL information does not exist, the media file processing device may not parse the PTL information from the decoder configuration record. That is, for example, when the value of the flag information is 1, the media file processing device may parse the PTL information from the decoder configuration record, and when the value of the flag information is 0, the media file processing device may not parse the PTL information. For example, the PTL information may be configured/included in the decoder configuration record based on the flag information equal to 1. That is, for example, when the value of the flag information is 1, the PTL information may be configured/included in the decoder configuration record. Also, for example, the PTL information may be not configured/included in the decoder configuration record based on the flag information equal to 0. That is, for example, when the value of the flag information is 0, the PTL information may not be configured/included in the decoder configuration record.

Here, for example, the PTL information may include a PTL record and/or a PTL index. For example, the PTL index may indicate a profile, tier, and level structure of an OLS represented by a (VVC) bitstream included in a track. For example, the PTL index may indicate a profile, tier, and level structure of an OLS represented by a bitstream in a track. Also, for example, the PTL record may include parameters for a profile, tier, and level structure. The profile, tier and level structure may be referred to as a PTL structure.

Meanwhile, although not shown, the media file processing apparatus may decode a bitstream based on the decoder configuration record. For example, the media file processing apparatus may decode video information in a bitstream for the decoder configuration record based on information included in the decoder configuration record, and generate a reconstructed picture based on the video information.

Figure 9:
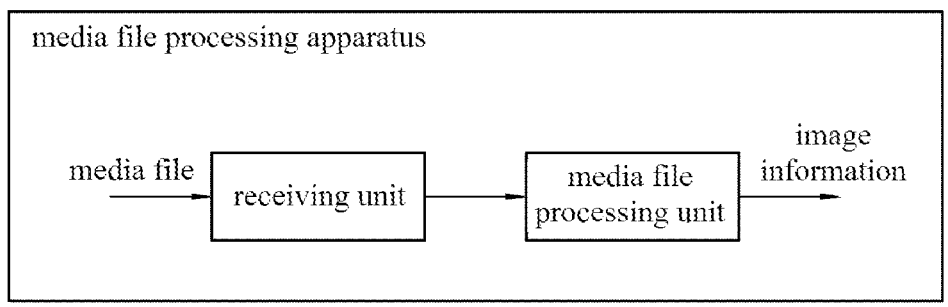
FIG. 9 briefly illustrates a method of processing a media file according to another embodiment of the present disclosure.

FIG. 9 briefly illustrates a method of processing a media file according to another embodiment of the present disclosure. The method disclosed in FIG. 8 may be performed by the media file processing apparatus disclosed in FIG. 9.

Specifically, for example, the receiving unit of the media file processing apparatus of FIG. 9 may perform S800 of FIG. 8 and the media file processing unit of the media file processing apparatus of FIG. 9 may perform S810 of FIG. 8. Meanwhile, although not shown, the media file processing device may include a decoder, and the decoder may decode a bitstream based on the decoder configuration record.

According to the present disclosure described above, when PTL information does not exist in the VVC decoder configuration record, information about the average frame rate (frame-rate), information about the constant frame rate and information about the number of temporal sublayers that does not need to be present in the VVC decoder configuration record may not be signaled, and through this, signaling redundancy for media file delivery may be reduced and overall coding efficiency may be improved.

In addition, according to the present disclosure, flag information indicating whether or not there is information on an operation point including all NAL units in a track, not just an operation point corresponding to a specific OLS, may be configured, and through this, a media file Signaling redundancy for transmission can be reduced and overall coding efficiency can be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 10:
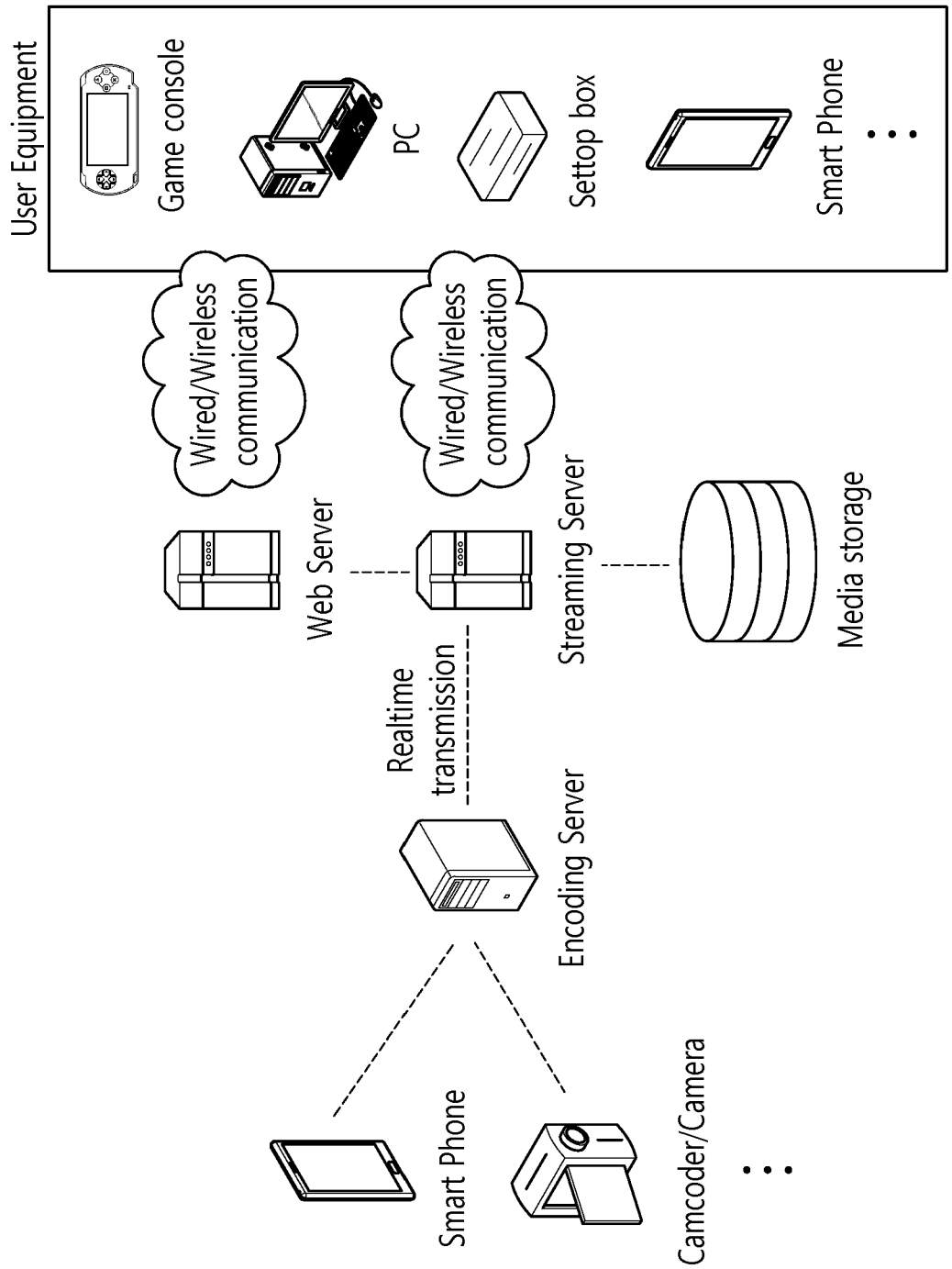
FIG. 10 illustrates a structural diagram of a contents streaming system to which the present disclosure is applied.

FIG. 10 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

The invention claimed is:

1. A method for generating a media file, the method comprising:
configuring flag information on whether Profile Tier Level (PTL) information is present;
configuring information on operating points based the flag information; and
generating a media file including a decoder configuration record,
wherein the decoder configuration record includes the flag information,
wherein an Output Layer Set (OLS) index, the PTL information and the information on the operating points are configured in the decoder configuration record based on the flag information being equal to 1, and
wherein the information on the operating points includes information on average frame rate, information on constant frame rate and information on a number of temporal sublayers.

2. The method of claim 1, wherein the flag information represents whether a track includes a bitstream corresponding to a specific operating point.

3. The method of claim 1, wherein the information on the average frame rate represents an average frame rate for a bitstream to which the decoder configuration record is applied,
wherein the information on the constant frame rate represents a constant frame rate for the decoder configuration record, and
wherein the information on the number of the temporal sublayers represents a number of temporal sublayers included in a track for the decoder configuration record.

4. The method of claim 1, wherein the OLS index represents an OLS represented by a bitstream included in a track, and
wherein the PTL information includes a PTL index representing a PTL structure of the OLS and a PTL record including parameters for the PTL structure.

5. The method of claim 1, wherein the media file includes a sample entry, and
wherein, based on an operating point used for configuring access units of a bitstream being derived based on information in the sample entry, information on the operating point is configured in the sample entry.

6. The method of claim 5, wherein the information in the sample entry includes the information on the number of the temporal layers and an Output Layer Set (OLS) index.

7. The method of claim 1, wherein the media file includes an operating point sample group, and
wherein, based on an operating point used for configuring access units of a bitstream being derived based on information in the operating point sample group, information on the operating point is configured in an entry for the operating point in the operating point sample group.

8. The method of claim 7, wherein the operating point sample group is a sample group with a grouping type 'vopi' or an entity group with a grouping type 'opeg'.

9. A media file generating device, comprising:
a memory; and
at least one processor connected to the memory, wherein the at least one processor is configured to:
configure flag information on whether Profile Tier Level (PTL) information is present;
configure information on operating points based the flag information; and
generate a media file including a decoder configuration record,
wherein the decoder configuration record includes the flag information,
wherein an Output Layer Set (OLS) index, the PTL information and the information on the operating points are configured in the decoder configuration record based on the flag information being equal to 1, and
wherein the information on the operating points includes information on average frame rate, information on constant frame rate and information on a number of temporal sublayers.

10. A method for processing a media file, the method comprising:
obtaining a media file including a decoder configuration record; and
parsing the decoder configuration record,
wherein the decoder configuration record includes flag information on whether Profile Tier Level (PTL) information is present,
wherein parsing the decoder configuration record comprises,
parsing information on operating points based the flag information,
wherein an Output Layer Set (OLS) index, the PTL information and the information on the operating points are configured in the decoder configuration record based on the flag information being equal to 1, and
wherein the information on the operating points includes information on average frame rate, information on constant frame rate and information on a number of temporal sublayers.

11. The method of claim 10, wherein the flag information represents whether a track includes a bitstream corresponding to a specific operating point.

12. The method of claim 10, wherein the information on the average frame rate represents an average frame rate for a bitstream to which the decoder configuration record is applied,
wherein the information on the constant frame rate represents a constant frame rate for the decoder configuration record, and
wherein the information on the number of the temporal sublayers represents a number of temporal sublayers included in a track for the decoder configuration record.

13. The method of claim 10, wherein the OLS index represents an OLS represented by a bitstream included in a track, and
wherein the PTL information includes a PTL index representing a PTL structure of the OLS and a PTL record including parameters for the PTL structure.

14. The method of claim 10, wherein the media file includes a sample entry, and
wherein, based on an operating point used for configuring access units of a bitstream being derived based on information in the sample entry, information on the operating point is configured in the sample entry.

15. The method of claim 10, wherein the media file includes an operating point sample group, and wherein, based on an operating point used for configuring access units of a bitstream being derived based on information in the operating point sample group, information on the operating point is configured in an entry for the operating point in the operating point sample group.

16. A media file processing device, comprising:

a memory; and at least one processor connected to the memory, wherein the at least one processor is configured to:

obtain a media file including a decoder configuration record; and parse the decoder configuration record, wherein the decoder configuration record includes flag information on whether Profile Tier Level (PTL) information is present, wherein information on operating points is parsed based the flag information, wherein an Output Layer Set (OLS) index, the PTL information and the information on the operating points are configured in the decoder configuration record based on the flag information being equal to 1, and wherein the information on the operating points includes information on average frame rate, information on constant frame rate and information on a number of temporal sublayers.

* * * * *